United States Patent
Teramoto et al.

(10) Patent No.: US 11,952,650 B2
(45) Date of Patent: *Apr. 9, 2024

(54) STEEL WIRE

(71) Applicants: NIPPON STEEL CORPORATION, Tokyo (JP); NIPPON STEEL SG WIRE CO., LTD., Tokyo (JP)

(72) Inventors: Shinya Teramoto, Tokyo (JP); Yutaka Neishi, Tokyo (JP); Michimasa Aono, Tokyo (JP); Shuji Kozawa, Tokyo (JP); Satoru Mineta, Tokyo (JP); Tatsuro Ochi, Tokyo (JP); Shoichi Suzuki, Tokyo (JP)

(73) Assignees: NIPPON STEEL CORPORATION, Tokyo (JP); NIPPON STEEL SG WIRE CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/754,748

(22) PCT Filed: Oct. 15, 2020

(86) PCT No.: PCT/JP2020/038954
§ 371 (c)(1),
(2) Date: Apr. 11, 2022

(87) PCT Pub. No.: WO2021/075509
PCT Pub. Date: Apr. 22, 2021

(65) Prior Publication Data
US 2023/0392244 A1      Dec. 7, 2023

(30) Foreign Application Priority Data

Oct. 16, 2019   (JP) .................. 2019-189270

(51) Int. Cl.
*C22C 38/54* (2006.01)
*B21C 1/00* (2006.01)
(Continued)

(52) U.S. Cl.
CPC ............. *C22C 38/54* (2013.01); *B21C 1/003* (2013.01); *B21C 37/045* (2013.01); *C21D 1/18* (2013.01);
(Continued)

(58) Field of Classification Search
None
See application file for complete search history.

(56) References Cited

U.S. PATENT DOCUMENTS

2008/0279714 A1   11/2008  Hashimura et al.
2009/0205753 A1   8/2009   Hashimura et al.
(Continued)

FOREIGN PATENT DOCUMENTS

JP   02057637 A   2/1990
JP   2006183137 A   7/2006
(Continued)

*Primary Examiner* — Anthony M Liang
(74) *Attorney, Agent, or Firm* — Greer, Burns & Crain, Ltd.

(57) ABSTRACT

A steel wire which has an excellent fatigue limit when made into a spring is provided. A chemical composition of the steel wire according to the present embodiment consists of, in mass %, C: 0.53 to 0.59%, Si: 2.51 to 2.90%, Mn: 0.70 to 0.85%, P: 0.020% or less, S: 0.020% or less, Cr 1.40 to 1.70%, Mo: 0.17 to 0.53%, V: 0.23 to 0.33%, Cu: 0.050% or less, Ni: 0.050% or less, Al: 0.0050% or less, Ti: 0.050% or less, N: 0.0070% or less, Ca: 0 to 0.0050%, and Nb: 0 to 0.020%, with the balance being Fe and impurities. In the steel wire, a number density of V-based precipitates having a maximum diameter ranging from 2 to 10 nm is 500 to 8000 pieces/μm².

4 Claims, 4 Drawing Sheets

(51) Int. Cl.
- *B21C 37/04* (2006.01)
- *C21D 1/18* (2006.01)
- *C21D 1/30* (2006.01)
- *C21D 1/74* (2006.01)
- *C21D 6/00* (2006.01)
- *C21D 8/06* (2006.01)
- *C21D 9/02* (2006.01)
- *C21D 9/52* (2006.01)
- *C22C 38/00* (2006.01)
- *C22C 38/04* (2006.01)
- *C22C 38/06* (2006.01)
- *C22C 38/34* (2006.01)
- *C22C 38/42* (2006.01)
- *C22C 38/44* (2006.01)
- *C22C 38/46* (2006.01)
- *C22C 38/48* (2006.01)
- *C22C 38/50* (2006.01)
- *F16F 1/02* (2006.01)

(52) U.S. Cl.
CPC ............ *C21D 1/30* (2013.01); *C21D 1/74* (2013.01); *C21D 6/004* (2013.01); *C21D 6/005* (2013.01); *C21D 6/008* (2013.01); *C21D 8/065* (2013.01); *C21D 9/02* (2013.01); *C21D 9/525* (2013.01); *C22C 38/001* (2013.01); *C22C 38/002* (2013.01); *C22C 38/04* (2013.01); *C22C 38/06* (2013.01); *C22C 38/34* (2013.01); *C22C 38/42* (2013.01); *C22C 38/44* (2013.01); *C22C 38/46* (2013.01); *C22C 38/48* (2013.01); *C22C 38/50* (2013.01); *C21D 2211/008* (2013.01); *C22C 2202/02* (2013.01); *F16F 1/021* (2013.01); *F16F 2224/0208* (2013.01)

(56) References Cited

U.S. PATENT DOCUMENTS

2009/0293998 A1    12/2009   Fujino et al.
2010/0028196 A1    2/2010   Hashimura et al.

FOREIGN PATENT DOCUMENTS

| | | |
|---|---|---|
| JP | 2007302950 A | 11/2007 |
| JP | 2010163689 A | 7/2010 |
| JP | 2010222604 A | 10/2010 |
| JP | 2018176268 A | 11/2018 |
| JP | 2018178184 A | 11/2018 |

[100]a  [010]a

[100]a  [010]a

STEEL WIRE

TECHNICAL FIELD

The present disclosure relates to a steel wire, and more particularly relates to a steel wire which serves as a starting material for springs typified by damper springs and valve springs.

BACKGROUND ART

Many springs are utilized in automobiles and general machinery. Among the springs used in automobiles and general machinery, damper springs have an action that absorbs an impact or vibrations from the outside. A damper spring is used, for example, in a torque converter that transmits the motive power of an automobile to the transmission. In a case where a damper spring is used in a torque converter, the damper spring absorbs vibrations of an internal combustion engine (e.g., an engine) of the automobile. Therefore, the damper spring needs to have a high fatigue limit.

Further, among springs used in automobiles and general machinery, a valve spring plays a role of regulating opening and closing of an internal valve of the automobile or general machinery. A valve spring is used, for example, to control opening and closing of an air supply valve of an internal combustion engine (engine) of an automobile. In order to regulate opening and closing of the valve, compression of the valve spring is repeated several thousands of times in one minute. Therefore, similarly to a damper spring, a valve spring also needs to have a high fatigue limit. In particular, compression of a valve spring is repeated several thousands of times within one minute, and that compression frequency is far greater than the compression frequency of a damper spring. Consequently, a valve spring is required to have a higher fatigue limit than a damper spring. Specifically, while a damper spring is required to have a high fatigue limit at $10^7$ cycles, a valve spring is required to have a high fatigue limit at $10^8$ cycles.

One example of a method for producing a spring typified by a damper spring or a valve spring is as follows. A quenching and tempering treatment is performed on a steel wire. The steel wire after the quenching and tempering treatment is subjected to cold coiling to form an intermediate steel material in a coil shape. The intermediate steel material is subjected to stress relief annealing treatment. Stress relief annealing treatment and, as necessary, nitriding are performed. That is, nitriding may be performed, or need not be performed. After the stress relief annealing treatment, or after the nitriding, as necessary, shot peening is performed to impart compressive residual stress to the outer layer. A spring is produced by the above process.

Recently, there have been a demand for further improvements in the fatigue limit of springs.

Techniques relating to improving the fatigue limit of springs are disclosed in Japanese Patent Application Publication No. 2-57637 (Patent Literature 1), Japanese Patent Application Publication No. 2010-163689 (Patent Literature 2), Japanese Patent Application Publication No. 2007-302950 (Patent Literature 3), and Japanese Patent Application Publication No. 2006-183137 (Patent Literature 4).

A steel wire for a spring having a high fatigue limit disclosed in Patent Literature 1 is produced by subjecting a steel having a chemical composition containing, in wt %, C: 0.3 to 1.3%, Si: 0.8 to 2.5%, Mn: 0.5 to 2.0% and Cr: 0.5 to 2.0%, and containing one or more types of element among Mo: 0.1 to 0.5%, V: 0.05 to 0.5%, Ti: 0.002 to 0.05%, Nb: 0.005 to 0.2%. B: 0.0003 to 0.01%, Cu: 0.1 to 2.0%, Al: 0.01 to 0.1% and N: 0.01 to 0.05% as optional elements, with the balance being Fe and unavoidable impurities, to air-cooling or rapid cooling after holding for 3 seconds to 30 minutes at 250 to 500° C. after an austenitizing treatment, and has a yield ratio of 0.85 or less. In this patent literature, the steel wire for a spring having a high fatigue limit that has the aforementioned composition is proposed based on the finding that the fatigue limit of a spring depends on the yield strength of the spring, with the fatigue limit of the spring increasing as the yield strength of the spring increases (see lines 1 to 5 in the right upper column on page 2 of Patent Literature 1).

A spring disclosed in Patent Literature 2 is produced using an oil tempered wire having a tempered martensitic structure, and the oil tempered wire consists of, in mass %, C: 0.50 to 0.75%, Si: 1.50 to 2.50%, Mn: 0.20 to 1.00%, Cr: 0.70 to 2.20% and V: 0.05 to 0.50%, with the balance being Fe and unavoidable impurities. When this oil tempered wire is subjected to gas soft nitriding for two hours at 450° C., the lattice constant of a nitrided layer formed on a wire surface portion of the oil tempered wire is 2.881 to 2.890 Å. Further, when this oil tempered wire is subjected to heating for two hours at 450° C., the tensile strength becomes 1974 MPa or more, the yield stress becomes 1769 MPa or more, and the reduction of area becomes more than 40%. In this patent literature, an oil tempered wire that is to serve as the starting material of a spring which is produced by being subjected to nitriding is defined. In the case of producing a spring by nitriding, as the time period in which nitriding is performed increases, the yield strength and tensile strength of the steel material of the spring decrease. In this case, the internal hardness of the steel material decreases, and the fatigue limit decreases. Therefore, in Patent Literature 2 it is disclosed that by using an oil tempered wire in which the yield strength of the steel material does not decrease even if the nitriding treatment time is long, a spring having a high fatigue limit can be produced (see paragraphs pg.11 [0025] and [0026] of Patent Literature 2).

A steel wire for a high strength spring disclosed in Patent Literature 3 has a chemical composition containing C: 0.5 to 0.7%, Si: 1.5 to 2.5%, Mn: 0.2 to 1.0%, Cr: 1.0 to 3.0% and V: 0.05 to 0.5%, in which Al is controlled to 0.005% or less (not including 0%), with the balance being Fe and unavoidable impurities. In the steel wire, the number of spherical cementite particles having an equivalent circular diameter ranging from 10 to 100 nm is 30 pieces/$\mu m^2$ or more, and a Cr concentration in the cementite is, in mass %, 20% or more and a V concentration is 2% or more. In Patent Literature 3 it is disclosed that increasing the strength of the steel wire is effective for improving the fatigue limit and settling resistance (see paragraph pg.2 [0003] of Patent Literature 3). Further, it is disclosed that by making the number of fine spherical cementite particles having an equivalent circular diameter ranging from 10 to 100 nm 30 pieces/$\mu m^2$ or more, and making the Cr concentration in the cementite 20% or more and making the V concentration in the cementite 2% or more in mass %, decomposition and elimination of cementite can be suppressed during a heat treatment such as a stress relief annealing treatment or nitriding during the production process, and the strength of the steel wire can be maintained (paragraph pg.6 [0011]).

A steel wire which serves as the starting material for a spring which is disclosed in Patent Literature 4 has a chemical composition consisting of, in mass %, C: 0.45 to 0.7%, Si: 1.0 to 3.0%, Mn: 0.1 to 2.0%, P: 0.015% or less, S: 0.015% or less, N: 0.0005 to 0.007%, and t-O: 0.0002 to 0.01%, with the balance being Fe and unavoidable impurities, and has a tensile strength of 2000 MPa or more. On a microscopic observation surface, the occupied area fraction of cementite-based spherical carbides and alloy carbides having an equivalent circular diameter of 0.2 μm or more is 7% or less, the density of cementite-based spherical carbides and alloy carbides having an equivalent circular diameter ranging from 0.2 to 3 μm is 1 pieces/μm$^2$ or less, the density of cementite-based spherical carbides and alloy carbides having an equivalent circular diameter of more than 3 μm is 0.001 pieces/μm$^2$ or less, the prior-austenite grain size number is 10 or more, the amount of retained austenite is 15 mass % or less, and the area fraction of a sparse region where the density of cementite-based spherical carbides having an equivalent circular diameter of 2 μm or more is low is 3% or less. In Patent Literature 4, it is disclosed that it is necessary to further increase the strength in order to further improve spring performance with respect to fatigue and settling and the like. In Patent Literature 4 it is also disclosed that by controlling the microstructure and controlling the distribution of cementite-based fine carbides, enhancement of the strength of the spring is realized and the spring performance with respect to fatigue and settling and the like is improved (see paragraph pg. 4 [0009] and [0021] of Patent Literature 4).

CITATION LIST

Patent Literature

Patent Literature 1: Japanese Patent Application Publication No. 2-57637
Patent Literature 2: Japanese Patent Application Publication No. 2010-163689
Patent Literature 3: Japanese Patent Application Publication No. 2007-302950
Patent Literature 4: Japanese Patent Application Publication No. 2006-183137

SUMMARY OF INVENTION

Technical Problem

In the respective techniques described in the above Patent Literatures 1 to 4, the technical idea of improving spring characteristics such as the fatigue limit or settling characteristics by increasing the strength (hardness) of the steel material that serves as the starting material of the spring is adopted. However, the fatigue limit of a spring may be increased by another technical idea.

An objective of the present disclosure is to provide a steel wire to be used for producing a spring that serves as the starting material of the spring, and which exhibits an excellent fatigue limit when made into a spring.

Solution to Problem

A steel wire according to the present disclosure has a chemical composition consisting of, in mass %,
C: 0.53 to 0.59%,
Si: 2.51 to 2.90%,
Mn: 0.70 to 0.85%,
P: 0.020% or less.
S: 0.020% or less,
Cr: 1.40 to 1.70%,
Mo: 0.17 to 0.53%,
V: 0.23 to 0.33%,
Cu: 0.050% or less,
Ni: 0.050% or less,
Al: 0.0050% or less,
Ti: 0.050% or less,
N: 0.0070% or less,
Ca: 0 to 0.0050%, and
Nb: 0 to 0.020%,
with the balance being Fe and impurities,
wherein a number density of V-based precipitates having a maximum diameter ranging from 2 to 10 nm is within a range of 500 to 8000 pieces/μm$^2$.

Advantageous Effect of Invention

A steel wire according to the present invention exhibits an excellent fatigue limit when a spring is produced using the steel wire as a starting material.

DESCRIPTION OF EMBODIMENTS

Figure 1A:
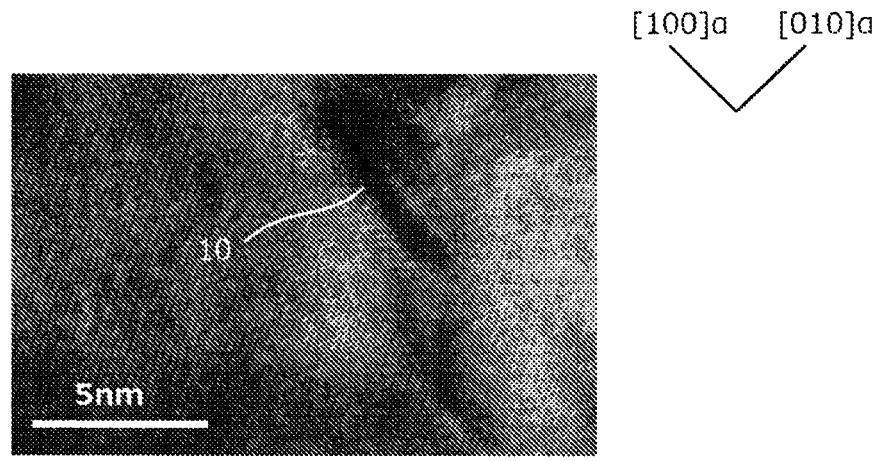
FIG. 1A is one example of a TEM image of a (001) plane in ferrite of a thin film sample.

As described in Patent Literatures 1 to 4, conventional spring techniques have been based on the idea that the strength and hardness of the steel material constituting a spring has a positive correlation with the fatigue limit of the spring. Thus, the idea that there is a positive correlation between the strength and hardness of the steel material and the fatigue limit is common technical knowledge with respect to spring techniques. Therefore, conventionally, as a substitute for a fatigue test which takes an extremely long time, fatigue limits of springs have been predicted based on the strength of the steel material that is obtained by a tensile test that is completed in a short time, or based on the hardness of the steel material that is obtained by a hardness test that is completed in a short time. In other words, the fatigue limits of springs have been predicted based on the results of a tensile test or a hardness test that do not take a long time, without performing a fatigue test that does take time.

However, the present inventors considered that the strength and hardness of a steel material and the fatigue limit do not necessarily always correlate. Therefore, the present inventors investigated methods for increasing the fatigue limit of a spring by another technical idea other than increasing the fatigue limit of a spring by increasing the strength and hardness of the spring.

Here, the present inventors focused their attention on V-based precipitates as typified by V carbides and V carbonitrides. In the present specification, the term "V-based precipitates" means precipitates containing V or containing V and Cr. The present inventors considered that by forming a large number of nano-sized fine V-based precipitates in a steel wire that is to serve as the starting material of a spring, the fatigue limit of a spring produced using the steel wire will be increased. Therefore, the present inventors considered that a chemical composition consisting of, in mass %, C: 0.53 to 0.59%, Si: 2.51 to 2.90%, Mn: 0.70 to 0.85%, P: 0.020% or less, S: 0.020% or less, Cr: 1.40 to 1.70%, Mo: 0.17 to 0.53%, V: 0.23 to 0.33%, Cu: 0.050% or less, Ni: 0.050% or less, Al: 0.0050% or less, Ti: 0.050% or less, N: 0.0070% or less, Ca: 0 to 0.0050% and Nb: 0 to 0.020%, with the balance being Fe and impurities, is suitable as the chemical composition of a steel wire for increasing the fatigue limit of a spring by making use of nano-sized V-based precipitates. The present inventors then produced springs by subjecting a steel wire having the aforementioned chemical composition to a heat treatment at various heat-treatment temperatures after quenching. The present inventors then investigated the fatigue limit of each spring as well as a fatigue limit ratio that is defined by the ratio of the fatigue limit to the hardness of the spring.

As a result of such investigations, the present inventors obtained the following novel finding with regard to a steel wire having the aforementioned chemical composition. As described in the foregoing background art, when producing springs, in some cases nitriding is performed and in some cases nitriding is not performed. In a case where nitriding is performed in the conventional process for producing a spring, in a heat treatment (stress relief annealing treatment step or the like) after a quenching and tempering step, a heat treatment is performed at a lower temperature than a nitriding temperature used for nitriding. This is because the conventional process for producing a spring is based on the technical idea that the fatigue limit of a spring is increased by keeping the strength and hardness of the spring high. In a case where nitriding is performed, it is necessary to perform heating to a nitriding temperature. Therefore, in the conventional production process, a decrease in the strength of the spring has been suppressed by setting a heat-treatment temperature in a heat treatment step other than nitriding to, as much as possible, a temperature that is less than the nitriding temperature.

However, for the steel wire of the present embodiment, instead of the technical idea of increasing the fatigue limit of a spring by increasing the strength of the spring, the present inventors adopted the technical idea of increasing the fatigue limit of a spring by formation of a large number of nano-sized fine V-based precipitates. For this reason, it has been revealed by the investigations of the present inventors that, during the production process, if a heat-treatment at a heat-treatment temperature within the range of 540 to 650° C. is performed to cause a large number of nano-sized fine V-based precipitates to precipitate, even if the heat-treatment temperature for precipitating V-based precipitates is higher than a nitriding temperature and as a result the strength of a core portion of the spring decreases (that is, even if the core portion hardness of the spring is low), an excellent fatigue limit will be obtained, and a fatigue limit ratio that is defined by the ratio of the fatigue limit to the core portion hardness of the spring will be high. More specifically, it has been revealed for the first time by the investigations of the present inventors that, in a steel wire that is to serve as the starting material of a spring, if the number density of V-based precipitates having a maximum diameter ranging from 2 to 10 nm is 500 pieces/μm² or more, a sufficient fatigue limit is obtained in a spring produced using the steel wire.

As described above, the steel wire of the present embodiment is a steel wire derived from a completely different technical idea to the conventional technical idea, and is composed as described below.

[1]

A steel wire having a chemical composition consisting of, in mass %,
C: 0.53 to 0.59%,
Si: 2.51 to 2.90%,
Mn: 0.70 to 0.85%,
P: 0.020% or less,
S: 0.020% or less,
Cr: 1.40 to 1.70%,
Mo: 0.17 to 0.53%,
V: 0.23 to 0.33%,
Cu: 0.050% or less,
Ni: 0.050% or less,
Al: 0.0050% or less,
Ti: 0.050% or less,
N: 0.0070% or less,
Ca: 0 to 0.0050%, and
Nb: 0 to 0.020%,
with the balance being Fe and impurities,
wherein a number density of V-based precipitates having a maximum diameter ranging from 2 to 10 nm is within a range of 500 to 8000 pieces/μm².

Here, the term "V-based precipitates" refers to, as mentioned above, carbides or carbo-nitrides containing V, or carbides or carbo-nitrides containing V and Cr. The V-based precipitates may be composite precipitates containing the aforementioned carbides or carbo-nitrides and one or more kinds of other element. The V-based precipitates precipitate in a plate shape along a {001} plane in ferrite. Therefore, in a TEM image of a (001) plane in ferrite, V-based precipitates are observed as line segments (edge portions) extending in a linear shape parallel to the [100] orientation or [010] orientation. Therefore, by observing a TEM image of a (001) plane in ferrite, V-based precipitates can be easily distinguished from other precipitates such as Fe carbides (cementite), and the V-based precipitates can be identified. That is, in the present specification, in a TEM image of a (001) plane in ferrite, line segments extending along the [100] orientation or the [010] orientation are defined as V-based precipitates.

[2]

A steel wire according to the steel wire described in [1], wherein:
in the chemical composition, a Ca content is from 0.0001 to 0.0050%; and when, among inclusions,
inclusions in which, in mass %, an O content is 10.0% or more are defined as oxide-based inclusions,
inclusions in which, in mass %, an S content is 10.0% or more and the O content is less than 10.0% are defined as sulfide-based inclusions, and
among the sulfide-based inclusions, inclusions in which, in mass %, a Ca content is 10.0% or more, the S content is 10.0% or more, and the O content is less than 10.0% are defined as Ca sulfides,
a numerical proportion of the Ca sulfides with respect to a total number of the oxide-based inclusions and the sulfide-based inclusions is 0.20% or less.

As mentioned above, compression of a valve spring is repeated several thousands of times in one minute, and the compression frequency of a valve spring is far greater than the compression frequency of a damper spring. Therefore, a valve spring is required to have an even higher fatigue limit than a damper spring. Specifically, although for a damper spring a high fatigue limit is required at a cycle count of $10^7$ cycles, in the case of a valve spring a high fatigue limit is required at a cycle count of $10^8$ cycles. Hereinafter, in the present specification a fatigue limit at a cycle count of $10^8$ cycles is referred to as a "high cycle fatigue limit".

Among the inclusions, in particular the Ca sulfides influence the high cycle fatigue limit. As mentioned above, among the inclusions, inclusions in which, in mass %, an O content is 10.0% or more are defined as oxide-based inclusions. Inclusions in which, in mass %, an S content is 10.0% or more and the O content is less than 10.0% are defined as sulfide-based inclusions. Among the sulfide-based inclusions, inclusions in which, in mass %, a Ca content is 10.0% or more, the S content is 10.0% or more, and the O content is less than 10.0% are defined as Ca sulfides. The Ca sulfides are one kind of sulfide-based inclusions. In a valve spring, in a case where the numerical proportion of Ca sulfides with respect to the total number of oxide-based inclusions and sulfide-based inclusions is low, the fatigue limit at a high cycle ($10^8$ cycles) increases. More specifically, when the numerical proportion of Ca sulfides with respect to the total number of oxide-based inclusions and sulfide-based inclusions is 0.20% or less, the high cycle fatigue limit particularly increases.

A conceivable reason for this is as follows. In a valve spring, in a case where the numerical proportion of Ca sulfides with respect to the total number of oxide-based inclusions and sulfide-based inclusions is low, Ca sufficiently dissolves in oxide-based inclusions and sulfide-based inclusions other than Ca sulfides. In this case, the oxide-based inclusions and sulfide-based inclusions are sufficiently softened and are made fine. Therefore, it is difficult for cracking to occur for which oxide-based inclusions or sulfide-based inclusions serve as a starting point, and the fatigue limit at a high cycle ($10^8$ cycles) increases.

[3]
The steel wire described in [1] or [2], wherein,
in the chemical composition:
an Nb content is 0.005 to 0.020%.

Hereunder, the steel wire of the present embodiment is described in detail. The symbol "%" in relation to an element means "mass %" unless specifically stated otherwise.

[Chemical Composition of Steel Wire]

As mentioned above, the steel wire of the present embodiment serves as a starting material for springs typified by valve springs and damper springs. That is, the steel wire of the present embodiment is a steel wire that is suitable for use in springs. The chemical composition of the steel wire of the present embodiment contains the following elements.

C: 0.53 to 0.59%

Carbon (C) increases the fatigue limit of a spring produced using the steel wire of the present embodiment. If the C content is less than 0.53%, even if the contents of other elements are within the range of the present embodiment, a sufficient fatigue limit will not be obtained. On the other hand, if the C content is more than 0.59%, even if the contents of other elements are within the range of the present embodiment, coarse cementite will form. In this case, the ductility of the steel wire that will serve as the starting material of a spring will decrease. In addition, the fatigue limit of a spring produced using the steel wire as a starting material will decrease. Accordingly, the C content is 0.53 to 0.59%. A preferable lower limit of the C content is 0.54%, and more preferably is 0.55%. A preferable upper limit of the C content is 0.58%, and more preferably is 0.57%.

Si: 2.51 to 2.90%

Silicon (Si) increases the fatigue limit of a spring produced using the steel wire of the present embodiment, and also increases the settling resistance of the spring. Si also deoxidizes the steel. In addition, Si increases the temper softening resistance of the steel material. Therefore, even after a quenching and tempering treatment is performed in the process for producing a spring, the strength of the spring can be maintained at a high level. If the Si content is less than 2.51%, even if the contents of other elements are within the range of the present embodiment, the aforementioned effects will not be sufficiently obtained. On the other hand, if the Si content is more than 2.90%, even if the contents of other elements are within the range of the present embodiment, the ductility of the steel wire will decrease. In addition, the fatigue limit of a spring produced using the steel wire as a starting material will decrease. Therefore, the Si content is 2.51 to 2.90%. A preferable lower limit of the Si content is 2.52%, more preferably is 2.55%, and further preferably is 2.60%. A preferable upper limit of the Si content is 2.85%, more preferably is 2.83%, and further preferably is 2.80%.

Mn: 0.70 to 0.85%

Manganese (Mn) improves the hardenability of the steel, and increases the fatigue limit of a spring produced using the steel wire of the present embodiment. If the Mn content is less than 0.70%, even if the contents of other elements are within the range of the present embodiment, the aforementioned effect will not be sufficiently obtained. On the other hand, if the Mn content is more than 0.85%, even if the contents of other elements are within the range of the present embodiment, during the process for producing a spring, the strength of the steel wire will become excessively high and the workability of the steel wire will decrease. Therefore, the Mn content is 0.70 to 0.85%. A preferable lower limit of the Mn content is 0.72%, more preferably is 0.73%, and further preferably is 0.74%. A preferable upper limit of the Mn content is 0.83%, more preferably is 0.82%, and further preferably is 0.81%.

P: 0.020% or less

Phosphorus (P) is an impurity that is unavoidably contained. That is, the P content is more than 0%. P segregates at grain boundaries, and decreases the fatigue limit of the spring. Therefore, the P content is 0.020% or less. A preferable upper limit of the P content is 0.018%, and more preferably is 0.016%. The P content is preferably as low as possible. However, excessively reducing the P content will raise the production cost. Therefore, when taking into consideration normal industrial production, a preferable lower limit of the P content is 0.001%, and more preferably is 0.002%.

S: 0.020% or less

Sulfur (S) is an impurity that is unavoidably contained. That is, the S content is more than 0%. S segregates at grain boundaries similarly to P, and combines with Mn to form MnS, and decreases the fatigue limit of the spring. Therefore, the S content is 0.020% or less. A preferable upper limit of the S content is 0.018%, and more preferably is 0.016%. The S content is preferably as low as possible. However, excessively reducing the S content will raise the production cost. Therefore, when taking into consideration normal industrial production, a preferable lower limit of the S content is 0.001%, and more preferably is 0.002%.

Cr: 1.40 to 1.70%

Chromium (Cr) improves the hardenability of the steel material. Cr also facilitates formation of V-based precipitates by being contained in combination with V and Mo. Therefore, Cr increases the fatigue limit of a spring produced using the steel wire of the present embodiment. If the Cr content is less than 1.40%, even if the contents of other elements are within the range of the present embodiment, the aforementioned effects will not be sufficiently obtained. On the other hand, if the Cr content is more than 1.70%, even if the contents of other elements are within the range of the present embodiment, coarse Cr carbides will excessively form and the fatigue limit of the spring will decrease. Therefore, the Cr content is 1.40 to 1.70%. A preferable lower limit of the Cr content is 1.45%, more preferably is 1.48%, and further preferably is 1.50%. A preferable upper limit of the Cr content is 1.65%, more preferably is 1.63%, and further preferably is 1.60%.

Mo: 0.17 to 0.53%

Molybdenum (Mo) improves the hardenability of the steel material. Mo also facilitates formation of V-based precipitates by being contained in combination with V and Cr. Therefore, Mo increases the fatigue limit of a spring produced using the steel wire of the present embodiment. Mo also increases the temper softening resistance of the steel material. Therefore, even after a quenching and tempering treatment is performed in the process for producing a spring, the strength of the spring can be maintained at a high level. If the Mo content is less than 0.17%, even if the contents of other elements are within the range of the present embodiment, the aforementioned effects will not be sufficiently obtained. On the other hand, if the Mo content is more than 0.53%, even if the contents of other elements are within the range of the present embodiment, during the process for producing a spring, the strength of the steel wire will become excessively high and the workability of the steel wire will decrease. Therefore, the Mo content is 0.17 to 0.53%. A preferable lower limit of the Mo content is 0.20%, more preferably is 0.23%, and further preferably is 0.25%. A preferable upper limit of the Mo content is 0.50%, more preferably is 0.47%, and further preferably is 0.45%.

V: 0.23 to 0.33%

Vanadium (V) combines with C and/or N to form fine V-based precipitates, and increases the fatigue limit of a spring produced using the steel wire of the present embodiment. If the V content is less than 0.23%, even if the contents of other elements are within the range of the present embodiment, the aforementioned effect will not be sufficiently obtained. On the other hand, if the V content is more than 0.33%, even if the contents of other elements are within the range of the present embodiment, V-based precipitates will coarsen and a large number of coarse V-based precipitates with a maximum diameter of more than 10 nm will form. In such a case, the fatigue limit of the spring will, on the contrary, decrease. Therefore, the V content is 0.23 to 0.33%. A preferable lower limit of the V content is 0.24%, more preferably is 0.25%, and further preferably is 0.26%. A preferable upper limit of the V content is 0.32%, more preferably is 0.31%, and further preferably is 0.30%.

Cu: 0.050% or less

Copper (Cu) is an impurity. Cu decreases the workability of the steel wire during the process for producing a spring. Therefore, the Cu content is 0.050% or less. A preferable upper limit of the Cu content is 0.045%, more preferably is 0.043%, further preferably is 0.040%, further preferably is 0.035%, further preferably is 0.030%, further preferably is 0.025%, and further preferably is 0.020%. The Cu content is preferably as low as possible. However, excessively reducing the Cu content will raise the production cost. Therefore, a preferable lower limit of the Cu content is more than 0%, more preferably is 0.001%, and further preferably is 0.002%.

Ni: 0.050% or less

Nickel (Ni) is an impurity. Ni decreases the workability of the steel wire during the process for producing a spring. Therefore, the Ni content is 0.050% or less. A preferable upper limit of the Ni content is 0.045%, more preferably is 0.043%, further preferably is 0.040%, and further preferably is 0.035%. The Ni content is preferably as low as possible. However, excessively reducing the Ni content will raise the production cost. Therefore, a preferable lower limit of the Ni content is more than 0%, more preferably is 0.001%, and further preferably is 0.002%.

Al; 0.0050% or less

Aluminum (Al) is an impurity. Al forms coarse non-metallic inclusions, and thereby decreases the fatigue limit of the spring. Therefore, the Al content is 0.0050% or less. A preferable upper limit of the Al content is 0.0045%, more preferably is 0.0043%, further preferably is 0.0040%, further preferably is 0.0035%, further preferably is 0.0030%, further preferably is 0.0025%, further preferably is 0.0020%, and further preferably is 0.0015%. The Al content is preferably as low as possible. However, excessively reducing the Al content will raise the production cost. Therefore, a preferable lower limit of the Al content is more than 0%, more preferably is 0.0001%, and further preferably is 0.0005%.

Ti: 0.050% or less

Titanium (Ti) is an impurity. Ti forms coarse TiN. TiN easily becomes a starting point of a fracture, and thus decreases the fatigue limit of the spring. Therefore, the Ti content is 0.050% or less. A preferable upper limit of the Ti content is 0.045%, more preferably is 0.043%, further preferably is 0.040%, further preferably is 0.035%, further preferably is 0.030%, further preferably is 0.025%, further preferably is 0.020%, further preferably is 0.015%, and further preferably is 0.010%. The Ti content is preferably as low as possible. However, excessively reducing the Ti content will raise the production cost. Therefore, a preferable lower limit of the Ti content is more than 0%, and more preferably is 0.001%.

N: 0.0070% or less

Nitrogen (N) is an impurity. N combines with Al or Ti to form AlN or TiN, and decreases the fatigue limit of the spring. Therefore, the N content is 0.0070%, or less. A preferable upper limit of the N content is 0.0060%, more preferably is 0.0055%, and further preferably is 0.0050%. The N content is preferably as low as possible. However, excessively reducing the N content will raise the production cost. Therefore, a preferable lower limit of the N content is more than 0%, more preferably is 0.001%, and further preferably is 0.0005%.

The balance in the chemical composition of the steel wire according to the present embodiment is Fe and impurities. Here, the term "impurities" refers to elements which, during industrial production of the steel wire, are mixed in from ore or scrap that is used as a raw material, or from the production environment or the like, and which are allowed within a range that does not adversely affect the steel wire of the present embodiment.

[Regarding Optional Elements]

The chemical composition of the steel wire according to the present embodiment may also contain Ca in lieu of a part of Fe.

Ca: 0 to 0.0050%

Calcium (Ca) is an optional element, and need not be contained. That is, the Ca content may be 0M. When contained, Ca is contained in oxide-based inclusions and sulfide-based inclusions, and softens these inclusions. The softened oxide-based inclusions and sulfide-based inclusions elongate and are divided during hot rolling and are thereby refined. Therefore, the fatigue limit of the spring increases, and in particular the high cycle fatigue limit increases. However, if the Ca content is more than 0.0050%, coarse Ca sulfides and coarse oxide-based inclusions (Ca oxides) will be formed. In this case, the fatigue limit of the spring will decrease. Therefore, the Ca content is 0 to 0.0050%. A preferable lower limit of the Ca content is 0.0001%, more preferably is 0.0002%, further preferably is 0.0003%, further preferably is 0.0004%, and further preferably is 0.0005%. A preferable upper limit of the Ca content is 0.0048%, more preferably is 0.0046%, further preferably is 0.0044%, further preferably is 0.0040%, further preferably is 0.0035%, further preferably is 0.0030%, further preferably is 0.0025%, further preferably is 0.0020%, and further preferably is 0.0015%.

The chemical composition of the steel wire according to the present embodiment may also contain Nb in lieu of a part of Fe.

Nb: 0 to 0.020%

Niobium (Nb) is an optional element, and need not be contained. That is, the Nb content may be 0%. When contained, Nb combines with C and/or N to form carbides or carbo-nitrides (hereunder, referred to as "Nb carbo-nitrides and the like"). The Nb carbo-nitrides and the like refine austenite grains and thereby increase the fatigue limit of the spring. If even a small amount of Nb is contained, the aforementioned effect is obtained to a certain extent. However, if the Nb content is more than 0.020%, coarse Nb carbo-nitrides and the like form, and the fatigue limit of the spring decreases. Therefore, the Nb content is 0 to 0.020%. A preferable lower limit of the Nb content is more than 0%, more preferably is 0.003%, further preferably is 0.005%, and further preferably is 0.010%. A preferable upper limit of the Nb content is 0.018%, more preferably is 0.017%, and further preferably is 0.016%.

[Microstructure of Steel Wire]

The microstructure of the steel wire of the present embodiment is a structure mainly composed of martensite. Here, the phrase "the microstructure is a structure mainly composed of martensite" means that the area fraction of martensite in the microstructure is 90.0% or more. Note that, the term "martensite" as used in the present specification means tempered martensite. Phases other than martensite in the microstructure of the steel wire are precipitates, inclusions, and retained austenite.

The area fraction of martensite can be determined by the following method. The steel wire according to the present embodiment is cut in a direction perpendicular to the longitudinal direction, and a test specimen is extracted. Among the surfaces of the extracted test specimen, a surface corresponding to a cross section perpendicular to the longitudinal direction of the steel wire is adopted as an observation surface. After mirror-polishing the observation surface, the observation surface is subjected to etching using 2% nitric acid-alcohol (nital etching reagent). On the etched observation surface, the middle position of a line segment (that is, a radius R) from the surface of the steel wire to the center thereof is defined as an R/2 position. The R/2 position of the observation surface is observed using an optical microscope having a magnification of 500×, and photographic images of an arbitrary five visual fields are generated. The size of each visual field is set to 100 μm×100 μm.

In each visual field, the contrast differs for the respective phases of martensite, retained austenite, precipitates, inclusions, and the like. Accordingly, martensite is identified based on the contrast. The gross area ($\mu m^2$) of martensite in each visual field is determined. The proportion of the gross area of martensite in all of the visual fields relative to the gross area ($10000\ \mu m^2 \times 5$) of all the visual fields is defined as the area fraction (%) of martensite.

[Number Density of V-Based Precipitates in Steel Wire]

In the steel wire of the present embodiment, the number density of V-based precipitates having a maximum diameter ranging from 2 to 10 nm is 500 to 8000 pieces/$\mu m^2$. In the present specification, the term "number density of V-based precipitates" means, in a case where a thin film sample having a thickness of 100 nm taken from the steel wire is observed using a transmission electron microscope (TEM), the number of V-based precipitates per unit area (1 $\mu m^2$) on the observation surface.

In the present specification, the term "V-based precipitates" refers to precipitates containing V, or V and Cr. Carbides containing V or V and Cr are defined as "V carbides", and carbo-nitrides containing V or V and Cr are defined as "V carbo-nitrides". The V-based precipitates are, for example, V carbides or V carbo-nitrides. The V-based precipitates may be composite precipitates containing either one of a V carbide and a V carbo-nitride and one or more kinds of other element. As mentioned above, the V-based precipitates need not contain Cr. The V-based precipitates precipitate in a plate shape along a {001} plane in ferrite. Therefore, in a TEM image of a (001) plane in ferrite, V-based precipitates are observed as line segments (edge portions) extending in a linear shape parallel to the [100] orientation or [010]orientation. Therefore, by observing a TEM image of the (001) plane in ferrite, V-based precipitates can be easily distinguished from other precipitates such as Fe carbides (cementite), and the V-based precipitates can be identified.

By causing a large number of nano-sized V-based precipitates having a maximum diameter ranging from 2 to 10 nm to precipitate in the steel wire of the present embodiment, the fatigue limit of a spring produced using the steel wire is increased. If the number density of V-based precipitates having a maximum diameter ranging from 2 to 10 nm is less than 500 pieces/$\mu m^2$, the V-based precipitates that contribute to improving the fatigue strength will be too few. In this case, a sufficient fatigue limit will not be obtained in the spring. If the number density of V-based precipitates having a maximum diameter ranging from 2 to 10 nm is 500 pieces/$\mu m^2$ or more, there will be sufficient V-based precipitates present in the steel wire. Consequently, the fatigue limit and fatigue limit ratio of the spring will noticeably increase. A preferable lower limit of the number density of V-based precipitates having a maximum diameter ranging from 2 to 10 nm is 600 pieces/$\mu m^2$, more preferably is 700 pieces/$\mu m^2$, and further preferably is 800 pieces/$\mu m^2$.

Note that, the upper limit of the number density of V-based precipitates having a maximum diameter ranging from 2 to 10 nm is not particularly limited. However, in the case of the chemical composition described above, the upper limit of the number density of V-based precipitates having a maximum diameter ranging from 2 to 10 nm is 8000 pieces/$\mu m^2$. The upper limit of the number density of V-based precipitates having a maximum diameter ranging from 2 to 10 nm may be 7500 pieces/$\mu m^2$, or may be 7000 pieces/$\mu m^2$.

In the steel wire according to the present embodiment, the number density of V-based precipitates having a maximum diameter ranging from 2 to 10 nm can be determined by the following method. The steel wire according to the present embodiment is cut perpendicularly to the longitudinal direction, and a disc having a surface (cross section) perpendicular to the longitudinal direction of the steel wire and having a thickness of 0.5 mm is extracted. Grinding and polishing are performed from both sides of the disc using emery paper to make the thickness of the disc 50 μm. Thereafter, a sample with a diameter of 3 mm is taken from the disc. The sample is immersed in 10% perchloric acid-glacial acetic acid solution to perform electrolytic polishing, to thereby prepare a thin film sample having a thickness of 100 nm.

The prepared thin film sample is observed using a transmission electron microscope (TEM). Specifically, first, analysis of Kikuchi lines is performed with respect to the thin film sample to identify the crystal orientation of the thin film sample. Next, the thin film sample is tilted based on the identified crystal orientation, and the thin film sample is set so that the (001) plane in ferrite (body-centered cubic lattice) can be observed. Specifically, the thin film sample is inserted into the TEM, and Kikuchi lines are observed. Tilting of the thin film sample is adjusted so that a [001] direction of ferrite in the Kikuchi lines matches the incident direction of an electron beam. After adjustment, when the actual image is observed, observation will be from a vertical direction to the (001) plane in ferrite. After performing the setting, observation visual fields at an arbitrary four locations of the thin film sample are identified. Each observation visual field is observed using an observation magnification of 200,000× and an accelerating voltage of 200 kV. The observation visual field is set to 0.09 μm×0.09 μm.

Figure 1B:
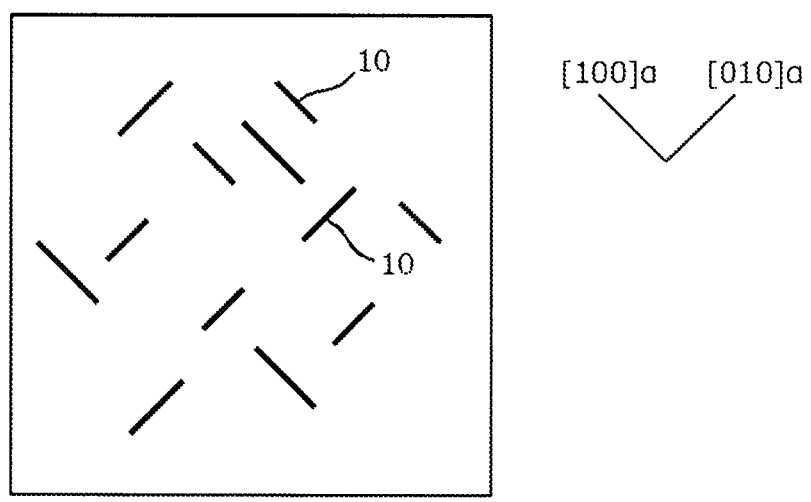
FIG. 1B is a schematic diagram of a TEM image of a (001) plane in ferrite of a thin film sample.

FIG. 1A is one example of a TEM image of a (001) plane in ferrite of a thin film sample, and FIG. 1B is a schematic diagram of a TEM image of a (001) plane in ferrite in a thin film sample. An axis denoted by [100]α in the figures means the [100] orientation in ferrite that is the parent phase. An axis denoted by [010]α in the figures means the [010] orientation in ferrite that is the parent phase. V-based precipitates precipitate in a plate shape along a {001} plane in ferrite. In ferrite grains on the (001) plane, V-based precipitates are observed as line segments (edge portions) extending linearly with respect to the [100] orientation or [010] orientation. In a TEM image, precipitates are shown with a contrast of a different brightness compared to the parent phase. Therefore, in a TEM image of a (001) plane in ferrite, line segments extending along the [100] orientation or [010] orientation are regarded as V-based precipitates. The length of the line segment of a V-based precipitate identified in the observation visual field is measured, and the measured length of the line segment is defined as the maximum diameter (nm) of the relevant V-based precipitate. For example, reference numeral 10 (a black-colored line segment) in FIG. 1A and FIG. 1B denotes a V-based precipitate.

The total number of V-based precipitates having a maximum diameter ranging from 2 to 10 nm in the four observation visual fields is determined by the aforementioned measurement. The number density (pieces/μm$^2$) of V-based precipitates having a maximum diameter ranging from 2 to 10 nm is determined based on the thus-determined total number of V-based precipitates and the gross area (0.0324 μm$^2$) of the four observation visual fields.

In the present specification, when a thin film sample having a thickness of 100 nm is used and the thin film sample is set so that the [100] orientation of ferrite in the thin film sample matches the incident direction of an electron beam of the TEM, and observation visual fields (each observation visual field is 0.09 μm×0.09 μm) at an arbitrary four locations of the thin film sample thus set are observed, the number of V-based precipitates having a maximum diameter ranging from 2 to 10 nm per unit area of the aforementioned observation visual fields which is measured by the aforementioned measurement is defined as the number density of V-based precipitates (pieces/μm$^2$).

[Preferable Ca Sulfides Numerical Proportion]

In the present embodiment, oxide-based inclusions, sulfide-based inclusions, and Ca sulfides in the steel wire are defined as follows:

Oxide-based inclusions: inclusions having, in mass %, an O content of 10.0% or more.

Sulfide-based inclusions: inclusions having, in mass %, an S content of 10.0% or more and an O content of less than 10.0%.

Ca sulfides: inclusions in which, among the sulfide-based inclusions, in mass %, a Ca content is 10.0% or more, an S content is 10.0% or more, and an O content is less than 10.0%.

The oxide-based inclusions are, for example, one or more types selected from a group consisting of $SiO_2$, MnO, $Al_2O_3$ and MgO. The oxide-based inclusions may be composite inclusions containing one or more types selected from the group consisting of $SiO_2$, MnO, $Al_2O_3$ and MgO, and another alloying element. The sulfide-based inclusions are, for example, one or more types selected from a group consisting of MnS and CaS, and may also be composite inclusions containing one or more types selected from the group consisting of MnS and CaS, and another alloying element. The Ca sulfides are, for example, CaS, and may be composite inclusions containing CaS and another alloying element.

In the steel wire, the numerical proportion of Ca sulfides with respect to the total number of oxide-based inclusions and sulfide-based inclusions is defined as the Ca sulfides numerical proportion Rca (%). That is, Rca is represented by the following equation.

$$Rca = \text{number of } Ca \text{ sulfides/total number of oxide-based inclusions and sulfide-based inclusions} \times 100 \quad (1)$$

In the steel wire of the present embodiment, preferably, the Ca content is 0.0001 to 0.0050%, and the Ca sulfides numerical proportion Rca in the steel wire is 0.20% or less. Here, when a radius in a cross section perpendicular to the longitudinal direction of the steel wire is defined as R mm, the phrase "Ca sulfides numerical proportion Rca in the steel wire" means the Ca sulfides numerical proportion Rca at an R/2 position in the cross section perpendicular to the longitudinal direction of the steel wire.

Figure 2:
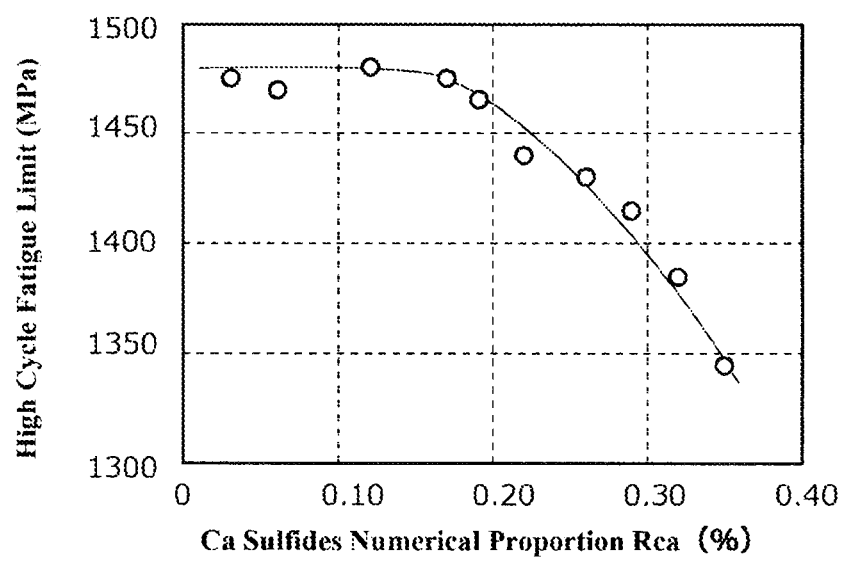
FIG. 2 is a graph illustrating the relation between a Ca sulfides numerical proportion Rca and a fatigue limit at a cycle count of 10$^8$ cycles (high cycle fatigue limit) with respect to a valve spring having a chemical composition of the present embodiment.

FIG. 2 is a graph illustrating the relation between the Ca sulfides numerical proportion Rca and a fatigue limit at a cycle count of $10^8$ cycles (high cycle fatigue limit) for a valve spring produced using a steel wire having the chemical composition of the present embodiment in which the Ca content is within the range of 0.0001 to 0.0050%. Referring to FIG. 2, when the Ca sulfides numerical proportion Rca is more than 0.20%, the high cycle fatigue limit noticeably increases as the Ca sulfides numerical proportion Rca decreases. On the other hand, when the Ca sulfides numerical proportion Rca is 0.20% or less, even when the Ca sulfides numerical proportion Rca is reduced, the high cycle fatigue limit does not increase very much, and is approximately constant. That is, in FIG. 2, an inflection point exists at the position where the Ca sulfides numerical proportion Rca=0.20%.

As described above, when the Ca sulfides numerical proportion Rca is more than 0.20%, the fatigue limit at a cycle count of $10^8$ cycles (high cycle fatigue limit) rapidly decreases. When the Ca sulfides numerical proportion Rca is 0.20% or less, an excellent high cycle fatigue limit is maintained. Therefore, in the steel wire of the present embodiment, preferably, the Ca content is within the range of 0.0001 to 0.0050%, and the Ca sulfides numerical proportion Rca in the steel wire is 0.20% or less. A preferable upper limit of the Ca sulfides numerical proportion Rca is 0.19%, more preferably is 0.18%, and further preferably is 0.17%. Note that, whilst a lower limit of the Ca sulfides numerical proportion is not particularly limited, in the case of the chemical composition described above, the lower limit of the Ca sulfides numerical proportion is, for example, 0%, or for example is 0.01%.

The Ca sulfides numerical proportion Rca is measured by the following method. The steel wire according to the present embodiment is cut in a perpendicular direction to the longitudinal direction, and a test specimen is extracted. Among the surfaces of the extracted test specimen, a surface corresponding to a cross section perpendicular to the longitudinal direction of the steel wire is adopted as an observation surface. The observation surface is mirror-polished. On the mirror-polished observation surface, observation visual fields (each observation visual field: 100 μm×100 μm) at an arbitrary 10 locations at an R/2 position are observed using a scanning electron microscope (SEM) with a magnification of 1000×.

The inclusions in each observation visual field are identified based on the contrast in each observation visual field. Each of the identified inclusions is subjected to energy dispersive X-ray spectroscopy (EDS) to identify oxide-based inclusions, sulfide-based inclusions, and Ca sulfides. Specifically, based on the elementary analysis results obtained by EDS with respect to the inclusions, inclusions having, in mass %, an O content of 10.0% or more among the inclusions are identified as "oxide-based inclusions". Among the inclusions, inclusions having, in mass %, an S content of 10.0% or more and an O content of less than 10.0% are identified as "sulfide-based inclusions". In addition, among the identified sulfide-based inclusions, inclusions having, in mass %, a Ca content of 10.0% or more, an S content of 10.0% or more, and an O content of less than 10.0% are identified as "Ca sulfides".

The inclusions which are the target of the aforementioned identification are inclusions having an equivalent circular diameter of 0.5 μm or more. Here, the term "equivalent circular diameter" means the diameter of a circle in a case where the area of each inclusion is converted into a circle having the same area. If the inclusions have an equivalent circular diameter that is two times or more the beam diameter in the EDS, the accuracy of the elementary analysis is increased. In the present embodiment, the beam diameter in the EDS used for identification of inclusions is assumed to be 0.2 μm. In this case, inclusions having an equivalent circular diameter of less than 0.5 μm cannot increase the accuracy of the elementary analysis in the EDS. In addition, inclusions having an equivalent circular diameter of less than 0.5 μm have an extremely small influence on the fatigue limit of a spring. Therefore, in the present embodiment, inclusions having an equivalent circular diameter of 0.5 μm or more are assumed to be the identification target. The upper limit of the equivalent circular diameter of oxide-based inclusions, sulfide-based inclusions, and Ca sulfides is not particularly limited, and for example is 100 μm.

The Ca sulfides numerical proportion Rca (%) is determined using equation (1) based on the total number of oxide-based inclusions and sulfide-based inclusions identified in the aforementioned observation visual fields at 10 locations, and the total number of Ca sulfides identified in the aforementioned observation visual fields at 10 locations.

$$Rca = \text{number of } Ca \text{ sulfides/total number of oxide-based inclusions and sulfide-based inclusions} \times 100 \quad (1)$$

As described above, in the steel wire of the present embodiment, the respective elements in the chemical composition are within the range of the present embodiment, and the number density of V-based precipitates having a maximum diameter ranging from 2 to 10 nm is within the range of 500 to 8000 pieces/μm$^2$. Therefore, a spring produced using the steel wire of the present embodiment has an excellent fatigue limit. Specifically, a high fatigue limit is obtained at a cycle count of 10$^7$ cycles. In this case, the steel wire of the present embodiment is, in particular, suitable for use in a damper spring.

Preferably, in the steel wire of the present embodiment, furthermore, the Ca content is 0.0001 to 0.0050%, and the Ca sulfides numerical proportion Rca is 0.20% or less. In this case, a further excellent fatigue limit is obtained in a spring produced using the steel wire of the present embodiment. Specifically, a high fatigue limit (high cycle fatigue limit) is obtained at a cycle count of 10$^8$ cycles. In this case, the steel wire of the present embodiment is, in particular, suitable for use in a valve spring.

[Method for Producing Steel Wire]

Hereunder, one example of a method for producing the steel wire of the present embodiment is described. Note that, as long as the steel wire of the present embodiment is constituted as described above, the production method is not limited to the production method described hereinafter. However, the production method described hereinafter is one favorable example of producing the steel wire of the present embodiment.

Figure 3:
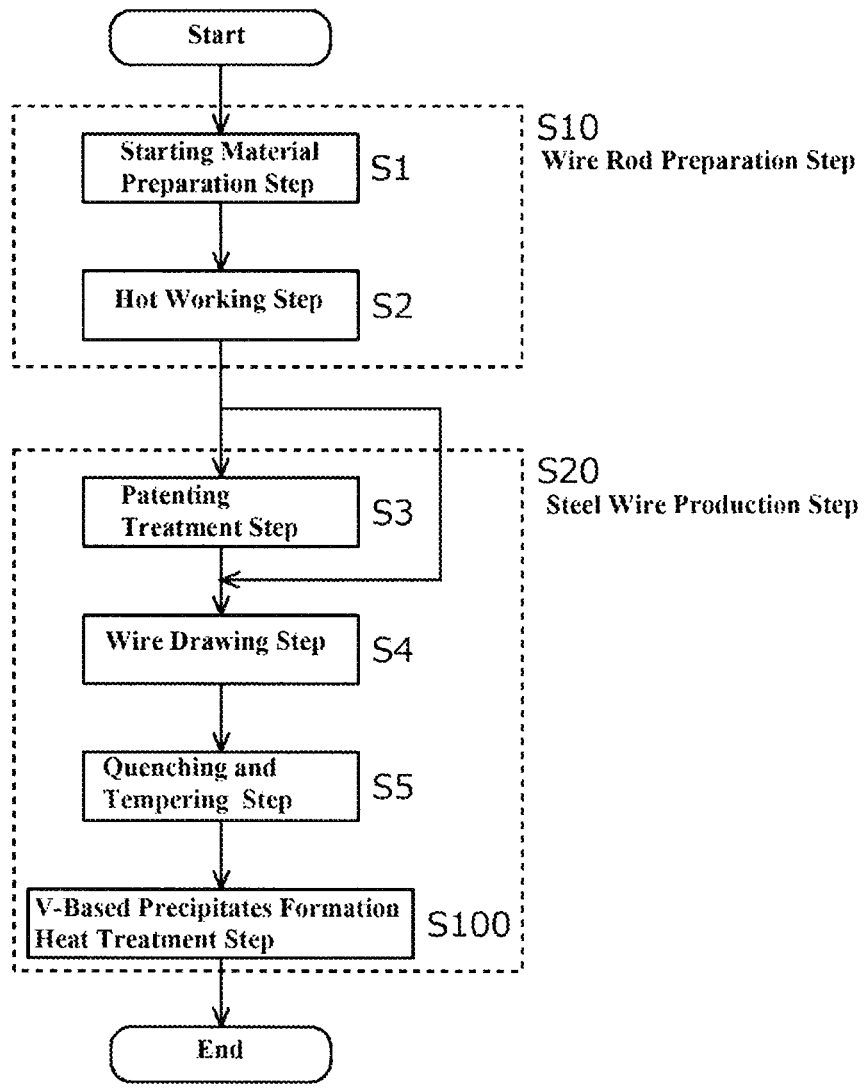
FIG. 3 is a flowchart illustrating a process for producing a steel wire of the present embodiment.

FIG. 3 is a flowchart illustrating one example of a process for producing the steel wire of the present embodiment. Referring to FIG. 3, the method for producing the steel wire of the present embodiment includes a wire rod preparation step (S10) and a steel wire production step (S20). Each of these steps is described hereunder.

[Wire Rod Preparation Step (S10)]

The wire rod preparation step (S10) includes a starting material preparation step (S1), and a hot working step (S2). In the wire rod preparation step (S10), a wire rod that will serve as the starting material of the steel wire is produced.

[Starting Material Preparation Step (S1)]

In the starting material preparation step (S1), a starting material having the aforementioned chemical composition is produced. The term "starting material" used here refers to a bloom or an ingot. In the starting material preparation step (S1), first, a molten steel having the aforementioned chemical composition is produced by a well-known refining method. The produced molten steel is used to produce a starting material (bloom or ingot). Specifically, a bloom is produced by a continuous casting process using the molten steel. Alternatively, an ingot is produced by an ingot-making process using the molten steel. The hot working step (S2) which is the next step is performed using the bloom or ingot.

[Hot Working Step (S2)]

In the hot working step (S2), the starting material (bloom or ingot) prepared in the starting material preparation step (S1) is subjected to hot working to produce a wire rod.

The hot working step (S2) includes a rough rolling process and a finish rolling process. In the rough rolling process, first, the starting material is heated. A reheating furnace or a soaking pit is used for heating the starting material. The starting material is heated to 1200 to 1300° C. by the reheating furnace or soaking pit. For example, the starting material is held for 1.5 to 10.0 hours at a furnace temperature of 1200 to 1300° C. After heating, the starting material is extracted from the reheating furnace or soaking pit and subjected to hot rolling. For example, a blooming mill is used for the hot rolling in the rough rolling process. The blooming mill is used to subject the starting material to blooming to produce a billet. If a continuous mill is arranged downstream of the blooming mill, the continuous mill may be used to further perform hot rolling on the billet obtained after performing the blooming, to thereby produce a billet of an even smaller size. In the continuous mill, horizontal stands having a pair of horizontal rolls and vertical stands having a pair of vertical rolls are alternately arranged in a row. By the above process, a billet is produced from the starting material in the rough rolling process.

In the finish rolling process, the billet obtained after the rough rolling process is subjected to hot rolling to produce a wire rod. Specifically, the billet is charged into a reheating furnace and heated at 900 to 1250° C. The heating time at the furnace temperature of 900 to 1250° C. is, for example, 0.5 to 5.0 hours. After heating, the billet is extracted from the reheating furnace. The extracted billet is subjected to hot rolling using a continuous mill to produce a wire rod. The diameter of the wire rod is not particularly limited. The diameter of the wire rod is determined based on the wire diameter of the spring that is the end product. A wire rod is produced by the above production process.

[Steel Wire Production Step (S20)]

In the steel wire production step (S20), the steel wire of the present embodiment that will serve as the starting material for a spring is produced. Here, the term "steel wire" means a steel material obtained by subjecting a wire rod that is a hot working material (hot rolling material) to wire drawing one or more times. The steel wire production step (S20) includes a patenting treatment step (S3) that is performed as necessary, a wire drawing step (S4), a quenching and tempering step (S5), and a V-based precipitates formation heat treatment step (S100).

[Patenting Treatment Step (S3)]

In the patenting treatment step (S3), a patenting treatment is performed on the wire rod produced by the wire rod preparation step (S10) to make the microstructure of a wire rod a ferrite and pearlite structure, and thereby soften the wire rod. It suffices to perform the patenting treatment by a well-known method. The heat-treatment temperature in the patenting treatment is for example, 550° C. or more, and more preferably is 580° C. or more. The upper limit of the heat-treatment temperature in the patenting treatment is 750° C. Note that, the patenting treatment step (S3) is not an essential step, and is an arbitrary step. That is, the patenting treatment step (S3) need not be performed.

[Wire Drawing Step (S4)]

If the patenting treatment step (S3) is performed, in the wire drawing step (S4) the wire rod after the patenting treatment step (S3) is subjected to wire drawing. If the patenting treatment step (S3) is not performed, in the wire drawing step (S4) the wire rod after the hot working step (S2) is subjected to wire drawing. By performing wire drawing, a steel wire having a desired outer diameter is produced. The wire drawing step (S4) may be performed by a well-known method. Specifically, the wire rod is subjected to a lubrication treatment, and a lubricant coating as typified by a phosphate coating or a metallic soap layer is formed on the surface of the wire rod. The wire rod after the lubrication treatment is subjected to wire drawing at normal temperature. A well-known wire drawing machine may be used for the wire drawing. A wire drawing machine is equipped with dies for subjecting the wire rod to wire drawing.

[Quenching and Tempering Step (S5)]

In the quenching and tempering step (S5), the steel wire after the wire drawing step (S4) is subjected to a quenching and tempering treatment. The quenching and tempering step (S5) includes a quenching process and a tempering process. In the quenching process, first, the steel wire is heated to the $A_{c3}$ transformation point or higher. For example, the heating is performed using a high frequency induction heating apparatus. The heated steel wire is rapidly cooled. The rapid cooling method may be water cooling or may be oil cooling. By performing the quenching process, the microstructure of the steel wire is made a structure that is mainly composed of martensite.

The steel wire after the quenching process is subjected to a tempering process. The tempering temperature in the tempering process is the $A_{c1}$ transformation point or lower. The tempering temperature is, for example, 250 to 500° C.

[V-Based Precipitates Formation Heat Treatment Step (S100)]

In the V-based precipitates formation heat treatment step (S100), the steel wire after the quenching and tempering step (S5) is subjected to a heat treatment (V-based precipitates formation heat treatment) to form V-based precipitates in the steel wire. By performing the V-based precipitates formation heat treatment step (S100), the number density of V-based precipitates having a maximum diameter ranging from 2 to 10 nm in the steel wire is made 500 to 8000 pieces/$\mu m^2$.

In the V-based precipitates formation heat treatment, a heat-treatment temperature T (° C.) is set within a range of 540 to 650° C. A holding time t (min) at the heat-treatment temperature T (° C.) is not particularly limited, and for example is within a range of 5/60 (that is, 5 sec) to 50 minutes.

In a case where a nitriding step will be performed in a process for producing a spring that is described later, the heat-treatment temperature T in the V-based precipitates formation heat treatment may be higher than the nitriding temperature in the nitriding step. In the conventional process for producing a spring, in a heat treatment (tempering process, stress relief annealing treatment process or the like) after a quenching process, a heat treatment is performed at a lower temperature than the nitriding temperature in the case of performing nitriding. This is because the conventional process for producing a spring is based on the technical idea that the fatigue limit is increased by maintaining the strength and hardness of the steel material at a high level. In a case where nitriding is performed, it is necessary to perform heating to a nitriding temperature. Therefore, in the conventional production process, a decrease in the strength of the steel material has been suppressed by, as much as possible, making a heat-treatment temperature in a heat treatment step other than a nitriding step less than the nitriding temperature. On the other hand, for the steel wire of the present embodiment, instead of the technical idea of increasing the fatigue limit of a spring by increasing the strength of the spring, the technical idea of increasing the fatigue limit of a spring by formation of a large number of nano-sized fine V-based precipitates was adopted. Therefore, in the V-based precipitates formation heat treatment, the heat-treatment temperature T is set to 540 to 650° C. that is a temperature region in which it is easy for V-based precipitates to form. A preferable lower limit of the heat-treatment temperature in the V-based precipitates formation heat treatment is 550° C., more preferably is 560° C., further preferably is 565° C., and further preferably is 570° C.

In addition, the V-based precipitates formation heat treatment is performed in a manner so that Fn defined by the following equation (2) is within the range of 27.0 to 40.0.

$$Fn = T \times \{t^{1/8} + (2Cr + Mo + 4V)\}/100 \qquad (2)$$

T in equation (2) represents a heat-treatment temperature (° C.) in the V-based precipitates formation heat treatment, and t represents a holding time (min) at the heat-treatment temperature T. The content (mass %) of a corresponding element in the chemical composition of the steel wire is substituted for each symbol of an element in equation (2).

The amount of V-based precipitates that are precipitated is influenced not only by the heat-treatment temperature T (° C.) and the holding time t (min), but also by the respective contents of Cr, Mo and V that are elements which contribute to formation of V-based precipitates.

Specifically, formation of V-based precipitates is facilitated by Cr and Mo. Although the reason for this is not clear, the following reason is conceivable. In a temperature region that is lower than a temperature region in which V-based precipitates form, Cr forms Fe-based carbides such as cementite or Cr carbides. Likewise, in a temperature region that is lower than a temperature region in which V-based precipitates form, Mo forms Mo carbides (MoC). As the temperature increases, the Fe-based carbides, Cr carbides, and Mo carbides dissolve and serve as nucleation sites for V-based precipitates. As a result, at the heat-treatment temperature T, formation of V-based precipitates is facilitated.

On the premise that the content of each element in the chemical composition of the steel wire is within the range of the present embodiment, if Fn is less than 27.0, formation of V-based precipitates will be insufficient in the V-based precipitates formation heat treatment. In this case, in the produced steel wire, the number density of V-based precipitates having a maximum diameter ranging from 2 to 10 nm will be less than 500 pieces/$\mu m^2$. On the other hand, on the premise that the content of each element in the chemical composition of the steel wire is within the range of the present embodiment, if Fn is more than 40.0, the formed V-based precipitates will coarsen. In this case, in the produced steel wire, the number density of V-based precipitates having a maximum diameter ranging from 2 to 10 nm will be less than 500 pieces/$\mu m^2$.

On the premise that the content of each element in the chemical composition of the steel wire is within the range of the present embodiment, when Fn is within the range of 27.0 to 40.0, in the produced steel wire, the number density of V-based precipitates having a maximum diameter ranging from 2 to 10 nm will be within the range of 500 to 8000 pieces/$\mu m^2$.

A preferable lower limit of Fn is 27.5, more preferably is 28.0, further preferably is 28.5, and further preferably is 29.0. A preferable upper limit of Fn is 39.5, more preferably is 39.0, further preferably is 38.5, and further preferably is 38.0.

The steel wire of the present embodiment can be produced by the above production process. Note that, in the production process described above, the quenching and tempering step (S5) and the V-based precipitates formation heat treatment step (S100) are performed separately from each other. However, the tempering process in the quenching and tempering step (S5) may be omitted, and the V-based precipitates formation heat treatment step (S100) may be performed after the quenching process. In this case, the steel wire after the quenching process is subjected to a heat treatment (V-based precipitates formation heat treatment) in which the heat-treatment temperature is set to 540 to 650° C., and which is performed in a manner so that Fn falls within the range of 27.0 to 40.0. In this way, the tempering process may be omitted and the V-based precipitates formation heat treatment step may be performed after the quenching process. In this case, in the V-based precipitates formation heat treatment, precipitation of V-based precipitates and tempering can be performed at the same time.

[Preferable Production Process for Making Ca Sulfides Numerical Proportion Rca in Steel Wire 0.20% or Less]

In the case of making the Ca content within the range of 0.0001 to 0.0050% and making the Ca sulfides numerical proportion Rca 0.20% or less in the steel wire, preferably, in the starting material preparation step (Si), a starting material is prepared that is produced by performing the following refining process and casting process.

[Refining Process]

In the refining process, refining of the molten steel and adjustment of the components of the molten steel are performed. The refining process includes primary refining and secondary refining. The primary refining is refining using a converter, and is well-known refining. The secondary refining is refining using a ladle, and is well-known refining. In the secondary refining, various kinds of ferro-alloys and auxiliary raw materials (slag forming agents) are added to the molten steel. Generally, ferro-alloys and auxiliary raw materials contain Ca in various forms. Therefore, in order to control the Ca content and the Ca sulfides numerical proportion Rca in a valve spring to be produced using the steel wire, (A) control of the Ca content contained in the ferro-alloys and (B) the timing of addition of auxiliary raw materials are important.

[Regarding (A)]

With respect to the aforementioned (A), the Ca content in ferro-alloys is high. Further, in the case of a molten steel subjected to Si deoxidation, the Ca yield in the molten steel is high. Therefore, in the secondary refining, if ferro-alloys in which the Ca content is high are added. Ca sulfides will excessively form in the molten steel and the Ca sulfides numerical proportion Rea will increase. Specifically, in the secondary refining, if the Ca content in ferro-alloys added to the molten steel is more than 1.0% by mass %, the Ca sulfides numerical proportion Rca will be more than 0.20%. Therefore, the Ca content in ferro-alloys added to the molten steel in the secondary refining is made 1.0% or less.

[Regarding (B)]

In addition, with respect to the aforementioned (B), auxiliary raw materials (slag forming agents) are added to the molten steel. The slag forming agents are quick lime, dolomite, or recycled slag containing Ca oxides or the like. The Ca in the slag forming agents added to the molten steel in the secondary refining of the refining process is contained in the slag forming agents as Ca oxides. Therefore, the Ca in the slag forming agents is incorporated into the slag during the secondary refining. However, if slag forming agents are added to the molten steel during the end stage of the secondary refining, the Ca will not sufficiently float up, and will remain in the molten steel without being incorporated into the slag. In this case, the Ca sulfides numerical proportion Rea will increase. Therefore, the slag forming agents are added to the molten steel before the end stage of the secondary refining. Here, the phrase "before the end stage of the secondary refining" means, in a case where the refining time period of the secondary refining is defined as "t (min)", at least within a time period until a time corresponding to 415 minutes elapses from the time at which the secondary refining started. That is, the slag forming agents are added to the molten steel before a time corresponding to 0.80 t minutes from the start of the secondary refining in the refining process.

[Casting Process]

A starting material (bloom or ingot) is produced using the molten steel produced by the aforementioned refining process. Specifically, a bloom is produced by a continuous casting process using the molten steel. Alternatively, an ingot may be produced by an ingot-making process using the molten steel. The hot working step (S2) that is the next step is performed using the produced bloom or ingot (starting material). The steps thereafter are the same as the steps described above.

By performing the production process described above, a steel wire can be produced in which the content of each element in the chemical composition is within the range of the present embodiment, the Ca content is 0.0001 to 0.0050%, the number density of V-based precipitates having a maximum diameter ranging from 2 to 10 nm is 500 to 8000 pieces/$\mu m^2$, and the Ca sulfides numerical proportion Rca is 0.20% or less.

[Method for Producing Spring Using Steel Wire]

Figure 4:
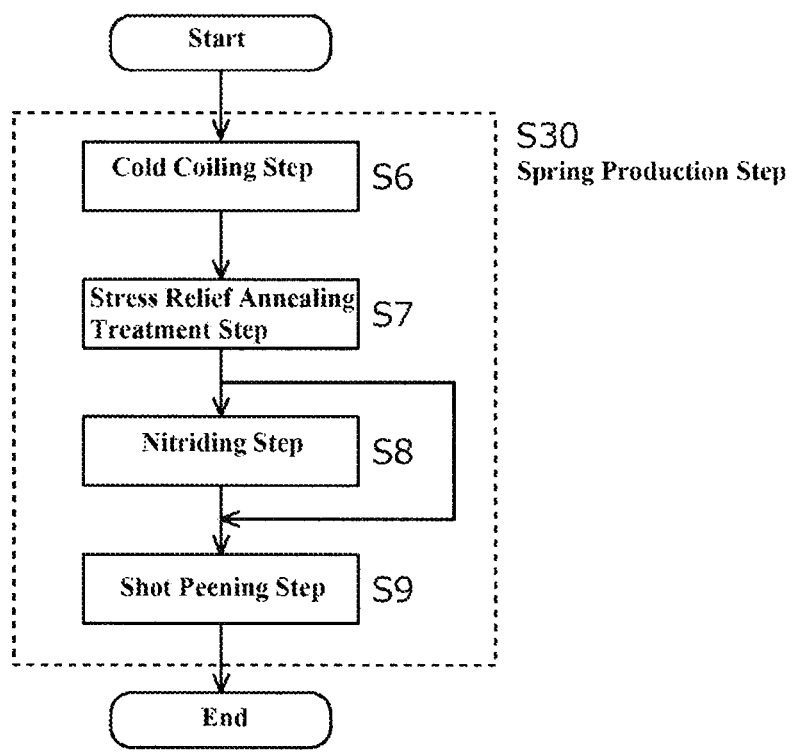
FIG. 4 is a flowchart illustrating a process for producing a spring using the steel wire of the present embodiment.

FIG. 4 is a flowchart illustrating one example of a method for producing a spring using the steel wire of the present embodiment. The method for producing a spring using the steel wire of the present embodiment includes a cold coiling step (S6), a stress relief annealing treatment step (S7), a nitriding step (S8) which is performed as necessary, and a shot peening step (S9).

[Cold Coiling Step (S6)]

In the cold coiling step (S6), the steel wire of the present embodiment produced by the steel wire production step (S20) is subjected to cold coiling to produce an intermediate steel material of a spring. The cold coiling is carried out using a well-known coiling apparatus. The coiling apparatus is equipped with, for example, a plurality of transfer roller sets, a wire guide, a plurality of coil forming tools (coiling pins), and a mandrel having a transverse section that is a semicircular shape. Each transfer roller set includes a pair of rollers that face each other. The plurality of transfer roller sets are arranged in a row. Each transfer roller set sandwiches the steel wire between the pair of rollers and conveys the steel wire in the wire guide direction. The steel wire passes through the wire guide. The steel wire that passed through the wire guide is bent in an arc shape by the plurality of coiling pins and the mandrel and thereby formed into a coil-shaped intermediate steel material.

[Stress Relief Annealing Treatment Step (S7)]

The stress relief annealing treatment step (S7) is an essential step. In the stress relief annealing treatment step (S7), an annealing treatment is performed in order to remove residual stress generated in the intermediate steel material by the cold coiling step. The treatment temperature (annealing temperature) in the annealing treatment is set to, for example, 400 to 500° C. Whilst the holding time at the annealing temperature is not particularly limited, for example the holding time is 10 to 50 minutes. After the holding time passes, the intermediate steel material is allowed to cool or is slow-cooled to normal temperature.

[Nitriding Step (S8)]

The nitriding step (S8) is an arbitrary step and is not an essential step. That is, the nitriding step may be performed or need not be performed. In a case where the nitriding step (S8) is performed, nitriding is performed on the intermediate steel material after the stress relief annealing treatment step (S7). In the nitriding, nitrogen is caused to penetrate into the outer layer of the intermediate steel material, and a nitrided layer (hardened layer) is formed at the outer layer of the intermediate steel material by solid-solution strengthening caused by solute nitrogen and precipitation strengthening caused by nitride formation.

It suffices to perform nitriding according to well-known conditions. The nitriding is performed at a treatment temperature (nitriding temperature) that is not more than the $A_{c1}$ transformation point. The nitriding temperature is, for example, 400 to 530° C. The holding time at the nitriding temperature is within the range of 1.0 hours to 5.0 hours. The atmosphere inside the furnace in which nitriding is performed is not particularly limited as long as the atmosphere is one in which the chemical potential of nitrogen becomes sufficiently high. The furnace atmosphere for nitriding, for example, may be made an atmosphere in which a gas with carburizing properties (RX gas or the like) is mixed as in the case of soft-nitriding.

[Shot Peening Step (S9)]

The shot peening step (S9) is an essential step. In the shot peening step (S9), shot peening is performed on the surface of the intermediate steel material after the stress relief annealing treatment step (S7), or the surface of the intermediate steel material after the nitriding step (S8). By this means, compressive residual stress is imparted to the outer layer of the spring, and the fatigue limit of the spring can be further increased. The shot peening may be performed by a well-known method. For example, blast media having a diameter of 0.01 to 1.5 mm is used for the shot peening. Well-known blast media such as steel shot or steel beads may be utilized as the blast media. The compressive residual stress imparted to the spring is adjusted depending on the diameter of the blast media, the shot velocity, the shot time period (duration), and the amount of blast media shot onto a unit area per unit time.

A spring is produced by the production process described above. The spring is, for example, a damper spring or a valve spring. Note that, in the process for producing a spring, as mentioned above, the nitriding step (SK) may be performed or need not be performed. In short, a spring produced using the steel wire of the present embodiment may be subjected to nitriding, or need not be subjected to nitriding.

[Configuration of Damper Spring]

In a case where the produced spring is a damper spring, the damper spring is a coil shape. The wire diameter, mean diameter of coil, coil inner diameter, coil outer diameter, free height, number of active coils, total number of coils, direction of helix, and pitch of the damper spring are not particularly limited.

Among damper springs, a damper spring subjected to nitriding is referred to as a "nitrided damper spring". Among damper springs, a damper spring not subjected to nitriding is referred to as a "non-nitrided damper spring". A nitrided damper spring includes a nitrided layer and a core portion. The nitrided layer includes a compound layer, and a diffusion layer that is formed further inward than the compound layer. The nitrided layer need not include a compound layer. The core portion is a base material portion that is further inward than the nitrided layer, and is a portion which is substantially unaffected by the diffusion of nitrogen caused by the nitriding. It is possible to distinguish between the nitrided layer and the core portion in the nitrided damper spring by microstructure observation. A non-nitrided damper spring does not have a nitrided layer.

When a nitrided damper spring is produced using the steel wire of the present embodiment, the chemical composition of the core portion of the nitrided damper spring is the same as the chemical composition of the steel wire of the present embodiment, and the number density of V-based precipitates having a maximum diameter ranging from 2 to 10 nm is within the range of 500 to 8000 pieces/$\mu m^2$. Therefore, an excellent fatigue limit is obtained in the nitrided damper spring. Note that, the microstructure of the core portion of the nitrided damper spring is the same as the microstructure of the steel wire, and the area fraction of martensite is 90.0% or more.

When a non-nitrided damper spring is produced using the steel wire of the present embodiment, within the non-nitrided damper spring (at an arbitrary R/2 position ("R" represents the radius) of a cross section in the wire diameter direction), the chemical composition is the same as the chemical composition of the steel wire of the present embodiment and, at the R/2 position, the number density of V-based precipitates having a maximum diameter ranging from 2 to 10 nm is within the range of 500 to 8000 pieces/$\mu m^2$. Therefore, even in the case of a non-nitrided damper spring, an excellent fatigue limit is obtained. Note that, the microstructure at the R/2 position of the non-nitrided damper spring is the same as the microstructure of the steel wire, and the area fraction of martensite is 90.0% or more.

[Configuration of Valve Spring]

In a case where the produced spring is a valve spring, the valve spring is a coil shape. The wire diameter, mean diameter of coil, coil inner diameter, coil outer diameter, free height, number of active coils, total number of coils, direction of helix, and pitch of the valve spring are not particularly limited.

Among valve springs, a valve spring subjected to nitriding is referred to as a "nitrided valve spring". Among valve springs, a valve spring not subjected to nitriding is referred to as a "non-nitrided valve spring". A nitrided valve spring includes a nitrided layer and a core portion. The nitrided layer includes a compound layer, and a diffusion layer that is formed further inward than the compound layer. The nitrided layer need not include a compound layer. The core portion is a base material portion that is further inward than the nitrided layer, and is a portion which is substantially unaffected by the diffusion of nitrogen caused by the nitriding. It is possible to distinguish between the nitrided layer and the core portion in the nitrided valve spring by microstructure observation. A non-nitrided valve spring does not have a nitrided layer.

When a nitrided valve spring is produced using the steel wire of the present embodiment, the chemical composition of the core portion of the nitrided valve spring is the same as the chemical composition of the steel wire of the present embodiment, and the number density of V-based precipitates having a maximum diameter ranging from 2 to 10 nm is within the range of 500 to 8000 pieces/$\mu m^2$. In addition, in the core portion, the Ca sulfides numerical proportion Rca is 0.20% or less. Therefore, an excellent high cycle fatigue limit is obtained in the nitrided valve spring. Note that, the microstructure of the core portion of the nitrided valve spring is the same as the microstructure of the steel wire, and the area fraction of martensite is 90.0% or more.

When a non-nitrided valve spring is produced using the steel wire of the present embodiment, within the non-nitrided valve spring (at an arbitrary R/2 position ("R" represents the radius) of a cross section in the wire diameter direction), the chemical composition is the same as the chemical composition of the steel wire of the present embodiment and, at the R/2 position, the number density of V-based precipitates having a maximum diameter ranging from 2 to 10 nm is within the range of 500 to 8000 pieces/$\mu m^2$. In addition, at the R/2 position, the Ca sulfides numerical proportion Rca is 0.20%/a or less. Therefore, even in the case of a non-nitrided valve spring, an excellent high cycle fatigue limit is obtained. Note that, the microstructure at the R/2 position of the non-nitrided valve spring is the same as the microstructure of the steel wire, and the area fraction of martensite is 90.0% or more.

Note that, a producer of the steel wire of the present embodiment may receive the supply of a wire rod from a third party, and may produce the steel wire using the prepared wire rod.

Example 1

Advantageous effects of the steel wire of the present embodiment will now be described more specifically by way of examples. The conditions adopted in the following examples are one example of conditions adopted for confirming the feasibility and advantageous effects of the steel wire of the present embodiment. Accordingly, the steel wire of the present embodiment is not limited to this one example of conditions.

In Example 1, steel wires to serve as the starting material of damper springs were produced. Further, nitrided damper springs and non-nitrided damper springs were produced using the steel wires, and the characteristics (fatigue limit) of the damper springs were investigated. Specifically, molten steels having the chemical compositions shown in Table 1 were produced.

TABLE 1

| Steel Type Number | Chemical Composition (unit is mass %; balance is Fe and impurities) | | | | | | | | | | | | | |
|---|---|---|---|---|---|---|---|---|---|---|---|---|---|---|
| | C | Si | Mn | P | S | Cr | Mo | V | Cu | Ni | Al | Ti | N | Nb |
| A | 0.55 | 2.71 | 0.76 | 0.007 | 0.007 | 1.56 | 0.31 | 0.28 | 0.009 | 0.029 | 0.0009 | 0.002 | 0.0039 | — |
| B | 0.55 | 2.89 | 0.75 | 0.009 | 0.008 | 1.52 | 0.29 | 0.29 | 0.010 | 0.030 | 0.0011 | 0.001 | 0.0042 | — |
| C | 0.56 | 2.51 | 0.81 | 0.008 | 0.006 | 1.55 | 0.23 | 0.30 | 0.009 | 0.021 | 0.0010 | 0.001 | 0.0044 | — |
| D | 0.56 | 2.72 | 0.78 | 0.007 | 0.009 | 1.53 | 0.27 | 0.26 | 0.012 | 0.027 | 0.0009 | 0.001 | 0.0040 | 0.012 |
| E | 0.55 | 2.72 | 0.78 | 0.008 | 0.005 | 1.53 | 0.28 | 0.27 | 0.010 | 0.026 | 0.0010 | 0.001 | 0.0038 | 0.016 |
| F | 0.55 | 2.75 | 0.77 | 0.008 | 0.007 | 1.55 | 0.26 | 0.33 | 0.013 | 0.030 | 0.0013 | 0.001 | 0.0031 | — |
| G | 0.57 | 2.74 | 0.80 | 0.006 | 0.008 | 1.58 | 0.30 | 0.23 | 0.009 | 0.029 | 0.0010 | 0.001 | 0.0042 | — |
| H | 0.56 | 2.67 | 0.77 | 0.007 | 0.009 | 1.42 | 0.28 | 0.27 | 0.010 | 0.024 | 0.0009 | 0.002 | 0.0040 | — |
| I | 0.57 | 2.63 | 0.81 | 0.009 | 0.008 | 1.69 | 0.30 | 0.28 | 0.009 | 0.022 | 0.0011 | 0.001 | 0.0038 | — |
| J | 0.55 | 2.72 | 0.78 | 0.008 | 0.007 | 1.50 | 0.18 | 0.29 | 0.008 | 0.026 | 0.0010 | 0.001 | 0.0042 | — |
| K | 0.56 | 2.70 | 0.79 | 0.008 | 0.009 | 1.52 | 0.50 | 0.27 | 0.009 | 0.029 | 0.0008 | 0.001 | 0.0044 | — |
| L | 0.56 | 2.47 | 0.76 | 0.007 | 0.006 | 1.51 | 0.28 | 0.30 | 0.011 | 0.030 | 0.0012 | 0.002 | 0.0040 | — |
| M | 0.56 | 2.71 | 0.77 | 0.007 | 0.007 | 1.56 | 0.29 | 0.20 | 0.009 | 0.026 | 0.0009 | 0.001 | 0.0037 | — |

In Table 1, the "-" symbol means that the content of the corresponding element was less than the detection limit. That is, it means that the corresponding element was not contained. For example, with regard to the Nb content of Steel Type Number A, the "-" symbol means that the content was "0"% when the content was rounded off to three decimal places. In the chemical compositions of the steel type numbers listed in Table 1, the balance other than the elements listed in Table 1 was Fe and impurities. Each of the aforementioned molten steels was used to produce a cast piece (bloom) by a continuous casting process. After heating the bloom, the bloom was subjected to blooming that is a rough rolling process and thereafter was subjected to rolling by a continuous mill to produce a billet in which a cross section perpendicular to the longitudinal direction was 162 mm×162 mm. The heating temperature used for the blooming was 1200 to 1250° C., and the holding time at the heating temperature was 2.0 hours.

The produced billet was subjected to a finish rolling process to produce a wire rod having a diameter of 5.5 mm. The heating temperature in a reheating furnace for each test number in the finish rolling process was 1150 to 1200° C., and the holding time at the heating temperature was 1.5 hours.

The produced wire rod was subjected to a patenting treatment. The heat-treatment temperature in the patenting treatment was 650 to 700° C., and the holding time at the heat-treatment temperature was 20 minutes. The wire rod after the patenting treatment was subjected to wire drawing to produce a steel wire having a diameter of 4.0 mm. The produced steel wire was subjected to quenching. The quenching temperature was 950 to 1000° C. The steel wire that was held at the quenching temperature was subjected to water-cooling. The steel wire after quenching was subjected to tempering. The tempering temperature was 480° C. The steel wire after tempering was subjected to a V-based precipitates formation heat treatment. A heat-treatment temperature T (C), a holding time t (min) at the heat-treatment temperature T, and an Fn value in the V-based precipitates formation heat treatment were as shown in Table 2. Note that in Test Number 16, a V-based precipitates formation heat treatment was not performed. Steel wires of the respective test numbers were produced by the above process.

TABLE 2

| Test Number | Steel Type Number | V-based Precipitates Formation Heat Treatment Process | | | Martensite Area Fraction (%) | V-based Precipitates Number Density (pieces/μm$^2$) | Nitrided | | Non-nitrided | |
|---|---|---|---|---|---|---|---|---|---|---|
| | | Heat-treatment Temperature T (° C.) | Holding Time t (min) | Fn | | | Fatigue Limit (MPa) | Fatigue Limit Ratio | Fatigue Limit (MPa) | Fatigue Limit Ratio |
| 1 | A | 590 | 15 | 35.1 | 98.3 | 3460 | 1540 | 2.63 | 1470 | 2.53 |
| 2 | B | 590 | 15 | 34.8 | 98.4 | 7222 | 1560 | 2.63 | 1495 | 2.52 |
| 3 | C | 590 | 15 | 35.0 | 98.2 | 2955 | 1515 | 2.60 | 1460 | 2.51 |
| 4 | D | 590 | 15 | 34.1 | 98.3 | 3293 | 1535 | 2.63 | 1475 | 2.53 |
| 5 | E | 590 | 15 | 34.4 | 98.3 | 3119 | 1535 | 2.62 | 1475 | 2.51 |
| 6 | F | 590 | 15 | 35.9 | 98.0 | 7902 | 1555 | 2.67 | 1495 | 2.57 |
| 7 | G | 590 | 15 | 34.1 | 97.9 | 1674 | 1530 | 2.62 | 1470 | 2.52 |
| 8 | H | 590 | 15 | 33.1 | 98.1 | 2846 | 1540 | 2.60 | 1470 | 2.51 |
| 9 | I | 590 | 15 | 36.6 | 98.5 | 5067 | 1555 | 2.66 | 1485 | 2.55 |
| 10 | J | 590 | 15 | 33.9 | 98.0 | 3006 | 1545 | 2.61 | 1475 | 2.52 |
| 11 | K | 590 | 15 | 35.5 | 98.7 | 4246 | 1550 | 2.64 | 1485 | 2.54 |
| 12 | A | 560 | 30 | 34.0 | 98.3 | 3677 | 1535 | 2.62 | 1480 | 2.52 |
| 13 | A | 600 | 5 | 34.6 | 98.0 | 3359 | 1530 | 2.62 | 1475 | 2.52 |
| 14 | L | 590 | 15 | 34.8 | 98.3 | 2280 | 1470 | 2.56 | 1430 | 2.49 |
| 15 | M | 590 | 15 | 33.1 | 98.6 | 472 | 1425 | 2.40 | 1370 | 2.31 |
| 16 | A | — | — | — | 97.9 | — | 1445 | 2.25 | 1405 | 2.18 |
| 17 | A | 500 | 0.2 | 26.8 | 98.4 | — | 1460 | 2.35 | 1400 | 2.31 |
| 18 | A | 490 | 0.5 | 26.8 | 98.3 | — | 1465 | 2.22 | 1410 | 2.13 |
| 19 | A | 660 | 30 | 40.1 | 99.0 | 355 | 1430 | 2.50 | 1390 | 2.47 |
| 20 | H | 540 | 0.08 | 26.6 | 98.2 | — | 1465 | 2.32 | 1410 | 2.21 |
| 21 | A | 650 | 50 | 40.2 | 99.3 | 377 | 1430 | 2.54 | 1380 | 2.46 |

Nitrided damper springs and non-nitrided damper springs were produced using the produced steel wires. The nitrided damper springs were produced by the following production method. The steel wire of each test number was subjected to cold coiling under the same conditions to produce a coiled intermediate steel material. A stress relief annealing treatment was performed on the intermediate steel material. The annealing temperature in the stress relief annealing treatment was 450° C., and the holding time at the annealing temperature was 20 minutes. After the holding time elapsed, the intermediate steel material was allowed to cool. The intermediate steel material after the stress relief annealing treatment was subjected to nitriding. The nitriding temperature was set to 450° C., and the holding time at the nitriding temperature was set to 5.0 hours. After nitriding, shot peening was performed under well-known conditions. First, shot peening was performed using cut wire having a diameter of 0.8 mm as the blast media. Next, shot peening was performed using steel shot having a diameter of 0.2 mm as the blast media. The shot velocity, shot time period (duration), and the amount of blast media shot onto a unit area per unit time in the shot peening of the first stage and the second stage were made the same for each test number. Nitrided damper springs were produced by the above production method.

The non-nitrided damper springs were produced by the following production method. The steel wire of each test number was subjected to cold coiling under the same conditions to produce a coiled intermediate steel material. A stress relief annealing treatment was performed on the intermediate steel material. The annealing temperature in the stress relief annealing treatment was 450° C., and the holding time at the annealing temperature was 20 minutes. After the holding time elapsed, the intermediate steel material was allowed to cool. After the stress relief annealing treatment, nitriding was not performed, and shot peening was performed under the same conditions as in the case of the nitrided damper springs. Non-nitrided damper springs were produced by the above production method.

Damper springs (nitrided and non-nitrided) were produced by the above production process. The produced steel wires and damper springs (nitrided and non-nitrided) of each test number were subjected to the following evaluation tests.

[Microstructure Observation Test]

The steel wire of each test number was cut in a direction perpendicular to the longitudinal direction, and a test specimen was extracted. Among the surfaces of the extracted test specimen, a surface corresponding to a cross section perpendicular to the longitudinal direction of the steel wire was adopted as the observation surface. After mirror-polishing the observation surface, the observation surface was subjected to etching using 2% nitric acid-alcohol (nital etching reagent). An R/2 position of the etched observation surface was observed using an optical microscope having a magnification of 500×, and photographic images of an arbitrary five visual fields were generated. The size of each visual field was set to 100 μm×100 μM. In each visual field, the contrast differed for the respective phases of martensite, retained austenite, precipitates, inclusions and the like. Therefore, martensite was identified based on the contrast. The gross area ($\mu m^2$) of martensite identified in each visual field was determined. The proportion of the gross area of martensite in all of the visual fields relative to the gross area (10000 $\mu m^2$×5) of all the visual fields was defined as the area fraction (%) of martensite. The area fraction of martensite thus determined is shown in Table 2. Note that, the nitrided damper spring of each test number was cut in the wire diameter direction and a test specimen was extracted. Further, the non-nitrided damper spring of each test number was cut in the wire diameter direction and a test specimen was extracted. Each of the extracted test specimens was subjected to the microstructure observation test described above. The results of the microstructure observation test showed that the area fraction of martensite of the core portion of the nitrided damper spring of each test number, and the area fraction of martensite of the non-nitrided damper spring of each test number were the same as the martensite area fraction of the steel wire of the corresponding test number.

[Test to Measure Number Density of V-Based Precipitates]

The steel wire of each test number was cut in a perpendicular direction to the longitudinal direction, and a disc having a surface (cross section) perpendicular to the longitudinal direction of the steel wire and having a thickness of 0.5 mm was extracted. Grinding and polishing were performed from both sides of the disc using emery paper to make the thickness of the disc 50 μm. Thereafter, a sample having a diameter of 3 mm was taken from the disc. The sample was immersed in 10% perchloric acid-glacial acetic acid solution to perform electrolytic polishing, to thereby prepare a thin film sample having a thickness of 100 nm.

The prepared thin film sample was observed using a transmission electron microscope. Specifically, first, analysis of Kikuchi lines was performed with respect to the thin film sample to identify the crystal orientation of the thin film sample. Next, the thin film sample was tilted based on the identified crystal orientation, and the thin film sample was arranged (set) so that the (001) plane in ferrite could be observed. After setting the thin film sample, observation visual fields at an arbitrary four locations of the thin film sample were identified. Each observation visual field was observed using an observation magnification of 200000× and an accelerating voltage of 200 kV. The observation visual field was set to 0.09 μm×0.09 μm. V-based precipitates precipitate in a plate shape along a {001} plane in ferrite. Therefore, in a TEM image of a (001) plane in ferrite, V-based precipitates are observed as line segments (edge portions) extending linearly with respect to the [100] orientation or [010] orientation. In a TEM image, precipitates are shown with a contrast of a different brightness compared to the parent phase. Therefore, in a TEM image of a (001) plane in ferrite, line segments extending along the [100] orientation or [010] orientation were regarded as V-based precipitates. The length of the line segment of the respective V-based precipitates identified in each of the observation visual fields was measured, and the measured length of the line segment was defined as the maximum diameter (nm) of the relevant V-based precipitate.

The total number of V-based precipitates having a maximum diameter ranging from 2 to 10 nm in the four observation visual fields was determined by the aforementioned measurement. The number density of V-based precipitates having a maximum diameter ranging from 2 to 10 nm (pieces/$\mu m^2$) was determined based on the determined total number of V-based precipitates and the gross area (0.0324 $\mu m^2$) of the four observation visual fields. The determined number density of V-based precipitates is shown in the "V-based Precipitates Number Density (pieces/$\mu m^2$)" column in Table 2. The symbol "-" in the "V-based Precipitates Number Density (pieces/$\mu m^2$)" column means that the number density was 0 pieces/$\mu m^2$. Note that, the number density of V-based precipitates in the nitrided damper spring of each test number was also measured by the same method as the method used to determine the number density of V-based precipitates in the steel wire. The results showed that the number density of V-based precipitates in the core portion of the nitrided damper spring of each test number was the same as the number density of V-based precipitates in the steel wire of the corresponding test number. Furthermore, the number density of V-based precipitates in the non-nitrided damper spring of each test number was measured by the same method as the method used to determine the number density of V-based precipitates in the steel wire. The results showed that the number density of V-based precipitates in the non-nitrided damper spring of each test number was the same as the number density of V-based precipitates in the steel wire of the corresponding test number.

[Vickers Hardness Measurement Test]

The hardness of the core portion of the nitrided damper spring of each test number was determined by a Vickers hardness test. Specifically, a Vickers hardness test in conformity with JIS Z 2244 (2009) was performed at an arbitrary three locations at an R/2 position of a cross section in the wire diameter direction of the nitrided damper spring of each test number. The test force was set to 0.49 N. The arithmetic mean value of the obtained Vickers hardness values at the three locations was adopted as the Vickers hardness of the core portion of the nitrided damper spring of the relevant test number.

Similarly, the hardness of the non-nitrided damper spring of each test number was determined by a Vickers hardness test. Specifically, a Vickers hardness test in conformity with JIS Z 2244 (2009) was performed at an arbitrary three locations at an R/2 position of a cross section in the wire diameter direction of the non-nitrided damper spring of each test number. The test force was set to 0.49 N. The arithmetic mean value of the obtained Vickers hardness values at the three locations was adopted as the Vickers hardness of the non-nitrided damper spring of the relevant test number.

[Fatigue Test]

A fatigue test described hereunder was conducted using the damper springs (nitrided and non-nitrided) of each test number. For the fatigue test, a compressive fatigue test was conducted in which a repeated load was applied in the direction of the central axis of the coiled damper springs (nitrided and non-nitrided). An electro-hydraulic servo type fatigue tester (load capacity 500 kN) was used as the testing machine.

As the test conditions, a stress ratio of 0.2 was set as the load, and the frequency was set from 1 to 3 Hz. The test was performed until the damper spring fractured, with a cycle count of $10^7$ cycles set as the upper limit. If the damper spring did not fracture before reaching $10^7$ cycles, the test was stopped at $10^7$ cycles and it was determined that the result of the test was "non-fracture". Here, the maximum value of the test stress when the damper spring was non-fracture at $10^7$ cycles was defined as "$F_M$", and the minimum value of the test stress when the damper spring fractured before reaching 10' cycles at not less than $F_M$ was defined as "$F_B$". The arithmetic mean value of $F_M$ and $F_B$ was defined as "$F_A$", and the value of $F_A$ in a case where $(F_B-F_M)/F_A \leq 0.10$ was defined as the fatigue limit (MPa). On the other hand, in a case where all the damper springs fractured as a result of undergoing the test, that is, in a case where $F_M$ could not be obtained, a test stress corresponding to a life of $10^7$ cycles was extrapolated based on the relation between the fracture life and the test stress, and the obtained test stress was defined as the fatigue limit (MPa). Here, the test stress corresponded to the surface stress amplitude at the fracture position. A fatigue limit (MPa) was determined for the damper springs of each test number based on the aforementioned definitions and the evaluation tests. In addition, the obtained fatigue limit and Vickers hardness were used to determine a fatigue limit ratio (=fatigue limit/Vickers hardness of core portion) of the nitrided damper spring, and a fatigue limit ratio (=fatigue limit/Vickers hardness) of the non-nitrided damper spring.

[Test Results]

The test results are shown in Table 2. Referring to Table 2, in Test Numbers 1 to 13, the chemical composition was appropriate and the production process was also appropriate. Therefore, in the microstructure of the steel wire of each of these test numbers, the martensite area fraction was 90.0% or more. In addition, in each of these test numbers, the number density of V-based precipitates having a maximum diameter ranging from 2 to 10 nm was 500 to 8000 pieces/$\mu m^2$. Therefore, in each of these test numbers, the fatigue limit of the nitrided damper spring produced using the steel wire was 1500 MPa or more, and the fatigue limit ratio (=fatigue limit/Vickers hardness of core portion) of the nitrided damper spring was 2.60 or more. Further, the fatigue limit of the non-nitrided damper spring produced using the steel wire was 1450 MPa or more, and the fatigue limit ratio (=fatigue limit/Vickers hardness) of the non-nitrided damper spring was 2.50 or more.

On the other hand, in Test Number 14, the Si content was too low. Therefore, the fatigue limit of the nitrided damper spring was less than 150) MPa, and the fatigue limit ratio was less than 2.60. Further, the fatigue limit of the non-nitrided damper spring was less than 1450 MPa, and the fatigue limit ratio was less than 2.50.

In Test Number 15, the V content was too low. Therefore, in the steel wire, the number density of V-based precipitates having a maximum diameter ranging from 2 to 10 nm was too low. Consequently, the fatigue limit of the nitrided damper spring was less than 1500 MPa, and the fatigue limit ratio was less than 2.60. Further, the fatigue limit of the non-nitrided damper spring was less than 1450 MPa, and the fatigue limit ratio was less than 2.50.

In Test Number 16, although the chemical composition was appropriate, the steel wire was not subjected to the V-based precipitates formation heat treatment. Therefore, in the steel wire, the number density of V-based precipitates having a maximum diameter ranging from 2 to 10 nm was too low. Consequently, the fatigue limit of the nitrided damper spring was less than 1500 MPa, and the fatigue limit ratio was less than 2.60. Further, the fatigue limit of the non-nitrided damper spring was less than 1450 MPa, and the fatigue limit ratio was less than 2.50.

In Test Numbers 17 and 18, although the chemical composition was appropriate, the heat-treatment temperature T in the V-based precipitates formation heat treatment was too low. Therefore, in the steel wire, the number density of V-based precipitates having a maximum diameter ranging from 2 to 10 nm was too low. Consequently, the fatigue limit of the nitrided damper spring was less than 1500 MPa, and the fatigue limit ratio was less than 2.60. Further, the fatigue limit of the non-nitrided damper spring was less than 1450 MPa, and the fatigue limit ratio was less than 2.50.

In Test Number 19, although the chemical composition was appropriate, the heat-treatment temperature in the V-based precipitates formation heat treatment was too high. Consequently, the V-based precipitates coarsened, and the number density of V-based precipitates having a maximum diameter ranging from 2 to 10 nm in the steel wire was too low. As a result, the fatigue limit of the nitrided damper spring was less than 1500 MPa, and the fatigue limit ratio was less than 2.60. Further, the fatigue limit of the non-nitrided damper spring was less than 1450 MPa, and the fatigue limit ratio was less than 2.50.

In Test Number 20, although the chemical composition was appropriate, and the heat-treatment temperature T in the V-based precipitates formation heat treatment was also appropriate, Fn was less than 27.0. Therefore, the number density of V-based precipitates having a maximum diameter ranging from 2 to 10 nm in the steel wire was too low. Consequently, the fatigue limit of the nitrided damper spring was less than 1500 MPa, and the fatigue limit ratio was less than 2.60. Further, the fatigue limit of the non-nitrided damper spring was less than 1450 MPa, and the fatigue limit ratio was less than 2.50.

In Test Number 21, although the chemical composition was appropriate, and the heat-treatment temperature T in the V-based precipitates formation heat treatment was also appropriate, the Fn value was more than 40.0. Therefore, the number density of V-based precipitates having a maximum diameter ranging from 2 to 10 nm in the steel wire was too low. Consequently, the fatigue limit of the nitrided damper spring was less than 1500 MPa, and the fatigue limit ratio was less than 2.60. Further, the fatigue limit of the non-nitrided damper spring was less than 1450 MPa, and the fatigue limit ratio was less than 2.50.

Example 2

In Example 2, steel wires to serve as the starting material of valve springs were produced. Further, nitrided valve springs and non-nitrided valve springs were produced using the steel wires, and the characteristics (fatigue limit) of the valve springs were investigated. Specifically, molten steels having the chemical compositions shown in Table 3 were produced.

TABLE 3

| Steel Type | Chemical Composition (unit is mass %; balance is Fe and impurities) | | | | | | | | | | | | | | |
|---|---|---|---|---|---|---|---|---|---|---|---|---|---|---|---|
| Number | C | Si | Mn | P | S | Cr | Mo | V | Cu | Ni | Al | Ti | N | Nb | Ca |
| A | 0.56 | 2.79 | 0.80 | 0.007 | 0.009 | 1.53 | 0.37 | 0.28 | 0.010 | 0.031 | 0.0009 | 0.001 | 0.0041 | — | 0.0008 |
| B | 0.56 | 2.90 | 0.80 | 0.008 | 0.008 | 1.57 | 0.26 | 0.29 | 0.010 | 0.027 | 0.0013 | 0.001 | 0.0047 | — | 0.0005 |
| C | 0.55 | 2.51 | 0.79 | 0.008 | 0.008 | 1.58 | 0.28 | 0.29 | 0.009 | 0.022 | 0.0009 | 0.001 | 0.0042 | — | 0.0008 |
| D | 0.55 | 2.74 | 0.81 | 0.010 | 0.009 | 1.58 | 0.26 | 0.30 | 0.008 | 0.029 | 0.0008 | 0.002 | 0.0037 | 0.015 | 0.0009 |
| E | 0.57 | 2.76 | 0.78 | 0.008 | 0.007 | 1.56 | 0.26 | 0.31 | 0.010 | 0.032 | 0.0009 | 0.001 | 0.0046 | 0.012 | 0.0010 |
| F | 0.55 | 2.72 | 0.79 | 0.005 | 0.006 | 1.55 | 0.27 | 0.33 | 0.009 | 0.027 | 0.0013 | 0.001 | 0.0040 | — | 0.0008 |
| G | 0.56 | 2.77 | 0.78 | 0.007 | 0.006 | 1.58 | 0.29 | 0.24 | 0.008 | 0.031 | 0.0014 | 0.001 | 0.0047 | — | 0.0007 |
| H | 0.56 | 2.71 | 0.80 | 0.008 | 0.007 | 1.41 | 0.25 | 0.28 | 0.009 | 0.023 | 0.0009 | 0.002 | 0.0046 | — | 0.0009 |
| I | 0.56 | 2.78 | 0.79 | 0.007 | 0.008 | 1.68 | 0.26 | 0.27 | 0.010 | 0.027 | 0.0010 | 0.001 | 0.0045 | — | 0.0008 |
| J | 0.55 | 2.75 | 0.83 | 0.006 | 0.009 | 1.55 | 0.18 | 0.30 | 0.010 | 0.025 | 0.0008 | 0.001 | 0.0038 | — | 0.0010 |
| K | 0.56 | 2.72 | 0.79 | 0.008 | 0.007 | 1.53 | 0.51 | 0.31 | 0.008 | 0.024 | 0.0011 | 0.001 | 0.0043 | — | 0.0009 |
| L | 0.56 | 2.47 | 0.76 | 0.007 | 0.008 | 1.59 | 0.26 | 0.28 | 0.011 | 0.029 | 0.0009 | 0.002 | 0.0038 | — | 0.0009 |
| M | 0.57 | 2.76 | 0.79 | 0.009 | 0.007 | 1.59 | 0.25 | 0.21 | 0.010 | 0.032 | 0.0013 | 0.001 | 0.0040 | — | 0.0006 |
| N | 0.56 | 2.74 | 0.81 | 0.010 | 0.007 | 1.54 | 0.27 | 0.28 | 0.007 | 0.030 | 0.0011 | 0.001 | 0.0037 | — | — |
| O | 0.57 | 2.73 | 0.80 | 0.008 | 0.009 | 1.52 | 0.28 | 0.27 | 0.008 | 0.028 | 0.0008 | 0.001 | 0.0045 | — | 0.0053 |

In Table 3, the "-" symbol means that the content of the corresponding element was less than the detection limit. That is, it means that the corresponding element was not contained. For example, with regard to the Nb content of Steel Type Number A, the "-" symbol means that the content was "0"% when the content was rounded off to three decimal places. In the chemical compositions of the steel type numbers listed in Table 3, the balance other than the elements listed in Table 3 was Fe and impurities. The refining conditions (Ca content (mass %) in ferro-alloys added to the molten steel in the secondary refining, and when the refining time from the start until completion of the secondary refining is defined as "t (min)", the time (min) from the start of the secondary refining until slag forming agents were added) when producing the molten steel were as shown in Table 4.

TABLE 4

| Test Number | Steel Type Number | Ca Content in Ferro-alloys (mass %) | Time from Starting Secondary Refining Until Adding Slag Forming Agents (min.) | V-based Precipitates Formation Heat Treatment Process | | | | Martensite Area Fraction (%) | V-based Precipitates Number Density (pieces/μm²) | Ca Sulfides Numerical Proportion Rca (%) | Nitrided | | Non-nitrided | |
|---|---|---|---|---|---|---|---|---|---|---|---|---|---|---|
| | | | | Heat-treatment Temperature T (° C.) | Holding Time t (min) | Fn | | | | | Fatigue Limit (MPa) | Fatigue Limit Ratio | Fatigue Limit (MPa) | Fatigue Limit Ratio |
| 1 | A | 0.6 | 0.70t | 590 | 15 | 35.1 | | 98.2 | 3270 | 0.10 | 1475 | 2.61 | 1435 | 2.51 |
| 2 | B | 0.7 | 0.70t | 590 | 15 | 35.2 | | 98.3 | 6820 | 0.09 | 1475 | 2.60 | 1425 | 2.51 |
| 3 | C | 0.7 | 0.70t | 590 | 15 | 35.4 | | 98.1 | 3269 | 0.10 | 1465 | 2.56 | 1415 | 2.46 |
| 4 | D | 0.6 | 0.70t | 590 | 15 | 35.5 | | 97.9 | 2473 | 0.11 | 1470 | 2.53 | 1420 | 2.44 |
| 5 | E | 0.6 | 0.70t | 590 | 15 | 35.5 | | 98.1 | 3017 | 0.10 | 1480 | 2.56 | 1430 | 2.47 |
| 6 | F | 0.6 | 0.70t | 590 | 15 | 35.9 | | 99.1 | 7849 | 0.12 | 1485 | 2.58 | 1430 | 2.48 |
| 7 | G | 0.7 | 0.70t | 590 | 15 | 34.3 | | 98.5 | 2034 | 0.12 | 1470 | 2.56 | 1415 | 2.46 |
| 8 | H | 0.6 | 0.70t | 590 | 15 | 33.0 | | 98.2 | 3674 | 0.11 | 1470 | 2.57 | 1420 | 2.47 |
| 9 | I | 0.7 | 0.70t | 590 | 15 | 36.0 | | 98.3 | 5024 | 0.12 | 1485 | 2.59 | 1430 | 2.51 |

TABLE 4-continued

| Test Number | Steel Type Number | Ca Content in Ferro-alloys (mass %) | Time from Starting Secondary Refining Until Adding Slag Forming Agents (min.) | V-based Precipitates Formation Heat Treatment Process | | | Martensite Area Fraction (%) | V-based Precipitates Number Density (pieces/μm²) | Ca Sulfides Numerical Proportion Rca (%) | Nitrided | | Non-nitrided | |
|---|---|---|---|---|---|---|---|---|---|---|---|---|---|
| | | | | Heat-treatment Temperature T (°C.) | Holding Time t (min) | Fn | | | | Fatigue Limit (MPa) | Fatigue Limit Ratio | Fatigue Limit (MPa) | Fatigue Limit Ratio |
| 10 | J | 0.7 | 0.70t | 590 | 15 | 34.7 | 98.3 | 3054 | 0.10 | 1475 | 2.57 | 1425 | 2.48 |
| 11 | K | 0.7 | 0.70t | 590 | 15 | 36.7 | 98.4 | 4876 | 0.11 | 1480 | 2.60 | 1430 | 2.51 |
| 12 | A | 0.7 | 0.70t | 560 | 30 | 34.0 | 98.2 | 3402 | 0.11 | 1470 | 2.58 | 1420 | 2.48 |
| 13 | A | 0.7 | 0.70t | 600 | 5 | 34.6 | 99.0 | 2866 | 0.12 | 1480 | 2.59 | 1425 | 2.50 |
| 14 | L | 0.6 | 0.70t | 590 | 15 | 35.2 | 98.3 | 1843 | 0.09 | 1395 | 2.45 | 1340 | 2.35 |
| 15 | M | 0.7 | 0.70t | 590 | 15 | 33.5 | 98.0 | 487 | 0.11 | 1400 | 2.40 | 1340 | 2.30 |
| 16 | N | — | 0.70t | 590 | 15 | 34.6 | 97.8 | 3612 | 0.00 | 1375 | 2.37 | 1325 | 2.28 |
| 17 | O | 0.6 | 0.70t | 590 | 15 | 34.2 | 98.5 | 5873 | 0.21 | 1370 | 2.35 | 1320 | 2.26 |
| 18 | A | 0.6 | 0.70t | — | — | — | 98.3 | — | 0.11 | 1415 | 2.18 | 1350 | 2.10 |
| 19 | B | 0.6 | 0.70t | — | — | — | 98.6 | — | 0.10 | 1405 | 2.12 | 1350 | 2.04 |
| 20 | A | 0.6 | 0.70t | 500 | 0.2 | 26.8 | 97.9 | — | 0.10 | 1395 | 2.13 | 1345 | 2.05 |
| 21 | B | 0.7 | 0.70t | 500 | 0.2 | 26.9 | 98.4 | — | 0.11 | 1410 | 2.16 | 1355 | 2.10 |
| 22 | A | 0.6 | 0.70t | 660 | 50 | 40.8 | 98.1 | 486 | 0.12 | 1385 | 2.44 | 1335 | 2.33 |
| 23 | A | 1.1 | 0.70t | 590 | 15 | 35.1 | 98.5 | 3189 | 0.21 | 1365 | 2.35 | 1315 | 2.30 |
| 24 | B | 0.6 | 0.85t | 590 | 15 | 35.2 | 98.0 | 6842 | 0.27 | 1365 | 2.35 | 1315 | 2.26 |
| 25 | H | 0.7 | 0.70t | 540 | 0.08 | 26.6 | 98.0 | — | 0.10 | 1405 | 2.16 | 1340 | 2.05 |
| 26 | A | 0.6 | 0.70t | 650 | 50 | 40.2 | 98.9 | 423 | 0.12 | 1390 | 2.44 | 1335 | 2.35 |

Each of the molten steels after refining was used to produce a bloom by a continuous casting process. After heating the bloom, the bloom was subjected to blooming that is a rough rolling process and thereafter was subjected to rolling by a continuous mill to produce a billet in which a cross section perpendicular to the longitudinal direction was 162 mm×162 mm. The heating temperature used for the blooming was 1200 to 1250° C., and the holding time at the heating temperature was 2.0 hours.

The produced billet was subjected to a finish rolling process to produce a wire rod having a diameter of 5.5 mm. The heating temperature in a reheating furnace for each test number in the finish rolling process was 1150 to 1200° C., and the holding time at the heating temperature was 1.5 hours.

The produced wire rod was subjected to a patenting treatment. The heat-treatment temperature in the patenting treatment was 650 to 700° C. and the holding time at the heat-treatment temperature was 20 minutes. The wire rod after the patenting treatment was subjected to wire drawing to produce a steel wire having a diameter of 4.0 mm. The produced steel wire was subjected to quenching. The quenching temperature was 950 to 1000° C. The steel wire held at the quenching temperature was subjected to water-cooling. The steel wire after quenching was subjected to tempering. The tempering temperature was 480° C. The steel wire after tempering was subjected to a V-based precipitates formation heat treatment. A heat-treatment temperature T (° C.), a holding time t (min) at the heat-treatment temperature T, and an Fn value in the V-based precipitates formation heat treatment were as shown in Table 4. Note that, for Test Numbers 18 and 19, a V-based precipitates formation heat treatment was not performed. Steel wires of the respective test numbers were produced by the above process.

Nitrided valve springs and non-nitrided valve springs were produced using the produced steel wires. Specifically, the nitrided valve springs were produced by the following production method. The steel wire of each test number was subjected to cold coiling under the same conditions to produce a coiled intermediate steel material. A stress relief annealing treatment was performed on the intermediate steel material. The annealing temperature in the stress relief annealing treatment was 450° C., and the holding time at the annealing temperature was 20 minutes. After the holding time elapsed, the intermediate steel material was allowed to cool. The intermediate steel material after the stress relief annealing treatment was subjected to nitriding. The nitriding temperature was set to 450° C., and the holding time at the nitriding temperature was set to 5.0 hours. After nitriding, shot peening was performed under well-known conditions. First, shot peening was performed using cut wire having a diameter of 0.8 mm as the blast media. Next, shot peening was performed using steel shot having a diameter of 0.2 mm as the blast media. The shot velocity, shot time period (duration), and the amount of blast media shot onto a unit area per unit time in the shot peening of the first stage and the second stage were made the same for each test number. Nitrided valve springs were produced by the above production method.

The non-nitrided valve springs were produced by the following production method. The steel wire of each test number was subjected to cold coiling under the same conditions to produce a coiled intermediate steel material. A stress relief annealing treatment was performed on the intermediate steel material. The annealing temperature in the stress relief annealing treatment was 450° C., and the holding time at the annealing temperature was 20 minutes. After the holding time elapsed, the intermediate steel material was allowed to cool. After the stress relief annealing treatment, nitriding was not performed, and shot peening was performed under the same conditions as in the case of the nitrided valve springs. Non-nitrided valve springs were produced by the above production method.

Valve springs (nitrided and non-nitrided) were produced by the above production process. The produced steel wires and valve springs (nitrided and non-nitrided) of each test number were subjected to the following evaluation tests.

[Microstructure Observation Test]

The martensite area fraction of the steel wire of each test number was determined by the same method as the method adopted in the microstructure observation test conducted in Example 1. The area fractions of martensite thus determined are shown in Table 4. Note that, the nitrided valve spring of each test number was cut in the wire diameter direction and a test specimen was extracted. Further, the non-nitrided valve spring of each test number was cut in the wire diameter direction and a test specimen was extracted. Each of the extracted test specimens was subjected to the microstructure observation test described above. The results of the microstructure observation test showed that the area fraction of martensite of the core portion of the nitrided valve spring of each test number, and the area fraction of martensite of the non-nitrided valve spring of each test number were the same as the martensite area fraction of the steel wire of the corresponding test number.

[Test to Measure Number Density of V-Based Precipitates]

The number density of V-based precipitates in the steel wire of each test number was determined by the same method as the method used in the test to measure the number density of V-based precipitates conducted in Example 1. Specifically, the steel wire of each test number was cut in a perpendicular direction to the longitudinal direction, and a disc having a surface (cross section) perpendicular to the longitudinal direction of the steel wire and having a thickness of 0.5 mm was extracted. Grinding and polishing were performed from both sides of the disc using emery paper to make the thickness of the disc 50 μm. Thereafter, a sample having a diameter of 3 mm was taken from the disc. The sample was immersed in 10% perchloric acid-glacial acetic acid solution to perform electrolytic polishing, to thereby prepare a thin film sample having a thickness of 100 nm.

The prepared thin film sample was used to determine the number density of V-based precipitates having a maximum diameter ranging from 2 to 10 nm (pieces/μm$^2$) by the same method as the method used in Example 1. The determined number density of V-based precipitates is shown in the "V-based Precipitates Number Density (pieces/μm$^2$)" column in Table 4. The symbol "-" in the "V-based Precipitates Number Density (pieces/μm$^2$)" column means that the number density was 0 pieces/μm$^2$. Note that, the number density of V-based precipitates in the nitrided valve spring of each test number was also measured by the same method as the method used to determine the number density of V-based precipitates in the steel wire. The results showed that the number density of V-based precipitates in the core portion of the nitrided valve spring of each test number was the same as the number density of V-based precipitates in the steel wire of the corresponding test number. Furthermore, the number density of V-based precipitates in the non-nitrided valve spring of each test number was measured by the same method as the method used to determine the number density of V-based precipitates in the steel wire. The results showed that the number density of V-based precipitates in the non-nitrided valve spring of each test number was the same as the number density of V-based precipitates in the steel wire of the corresponding test number.

[Ca Sulfides Numerical Proportion Rca Measurement Test]

The steel wire of each test number was cut in a direction perpendicular to the longitudinal direction, and a test specimen was extracted. Among the surfaces of the extracted test specimen, a surface corresponding to a cross section perpendicular to the longitudinal direction of the steel wire was adopted as the observation surface. The observation surface was mirror-polished. On the mirror-polished observation surface, observation visual fields (each observation visual field: 100 μm×100 μm) at an arbitrary 10 locations at an R/2 position were observed using an SEM with a magnification of 1000×.

The inclusions in each observation visual field were identified based on the contrast in each observation visual field. Each of the identified inclusions was subjected to EDS to identify oxide-based inclusions, sulfide-based inclusions, and Ca sulfides. Specifically, based on the elementary analysis results obtained by EDS with respect to the inclusions, inclusions having, in mass %, an O content of 100% or more among the inclusions were identified as "oxide-based inclusions". Among the inclusions, inclusions having, in mass %, an S content of 10.0% or more and an O content of less than 10.0% were identified as "sulfide-based inclusions". In addition, among the identified sulfide-based inclusions, inclusions having, in mass %, a Ca content of 10.0% or more, an S content of 100% or more, and an O content of less than 10.0% were identified as "Ca sulfides".

The inclusions which were the target of the aforementioned identification were inclusions having an equivalent circular diameter of 0.5 sun or more. The beam diameter in the EDS used for identification of inclusions was set to 0.2 sm. The Ca sulfides numerical proportion Rca (%) was determined using equation (1) based on the total number of oxide-based inclusions and sulfide-based inclusions identified in the aforementioned observation visual fields at 10 locations, and the total number of Ca sulfides identified in the aforementioned observation visual fields at 10 locations.

$$Rca = \text{number of Ca sulfides/total number of oxide-based inclusions and sulfide-based inclusions} \times 100 \quad (1)$$

[Vickers Hardness Measurement Test]

The hardness of the core portion of the nitrided valve spring of each test number was determined by a Vickers hardness test. Specifically, a Vickers hardness test in conformity with JIS Z 2244(2009) was performed at an arbitrary three locations at an R/2 position of a cross section in the wire diameter direction of the nitrided valve spring of each test number. The test force was set to 0.49 N. The arithmetic mean value of the obtained Vickers hardness values at the three locations was adopted as the Vickers hardness of the core portion of the nitrided valve spring of the relevant test number.

Similarly, the hardness of the non-nitrided valve spring of each test number was determined by a Vickers hardness test. Specifically, a Vickers hardness test in conformity with JIS Z 2244 (2009) was performed at an arbitrary three locations at an R/2 position of a cross section in the wire diameter direction of the non-nitrided valve spring of each test number. The test force was set to 0.49 N. The arithmetic mean value of the obtained Vickers hardness values at the three locations was adopted as the Vickers hardness of the non-nitrided valve spring of the relevant test number.

[Fatigue Test]

A fatigue test described hereunder was conducted using the valve springs (nitrided and non-nitrided) of each test number. For the fatigue test, a compressive fatigue test was conducted in which a repeated load was applied in the direction of the central axis of the coiled valve springs (nitrided and non-nitrided). An electro-hydraulic servo type fatigue tester (load capacity 500 kN) was used as the testing machine.

As the test conditions, a stress ratio of 0.2 was set as the load, and the frequency was set from 1 to 3 Hz. The test was performed until the valve spring fractured, with a cycle count of $10^8$ cycles set as the upper limit. If the valve spring did not fracture before reaching $10^8$ cycles, the test was stopped at $10^8$ cycles and it was determined that the result of the test was "non-fracture". Here, the maximum value of the test stress when the valve spring was non-fracture at $10^8$ cycles was defined as "$F_M$", and the minimum value of the test stress when the valve spring fractured before reaching $10^8$ cycles at not less than $F_M$ was defined as "$F_B$". The arithmetic mean value of $F_M$ and $F_B$ was defined as "$F_A$", and the value of $F_A$ in a case where $(F_B-F_M)/F_A \leq 0.10$ was defined as the fatigue limit (MPa). On the other hand, in a case where all the valve springs fractured as a result of undergoing the test, that is, in a case where F could not be obtained, a test stress corresponding to a life of $10^8$ cycles was extrapolated based on the relation between the fracture life and the test stress, and the obtained test stress was defined as the fatigue limit (MPa). Here, the test stress corresponded to the surface stress amplitude at the fracture position. For the valve springs of each test number, a fatigue limit (MPa) at a high cycle was determined based on the aforementioned definitions and the evaluation tests. In addition, the obtained fatigue limit and Vickers hardness was used to determine a fatigue limit ratio (=fatigue limit/Vickers hardness of core portion) of the nitrided valve spring, and a fatigue limit ratio (=fatigue limit/Vickers hardness) of the non-nitrided valve spring.

[Test Results]

The test results are shown in Table 4. Referring to Table 4, in Test Numbers 1 to 13, the chemical composition was appropriate and the production process was also appropriate. Therefore, in the microstructure of the steel wire, the martensite area fraction was 90.0% or more. In addition, in each of these test numbers, the number density of V-based precipitates having a maximum diameter ranging from 2 to 10 nm was 500 to 8000 pieces/$\mu m^2$. Furthermore, the Ca sulfides numerical proportion Rca was 0.20% or less. Therefore, the fatigue limit at a high cycle of the nitrided valve spring produced using the steel wire was 1450 MPa or more, and the fatigue limit ratio (=fatigue limit/Vickers hardness of core portion) of the nitrided valve spring was 2.50 or more. Further, the fatigue limit at a high cycle of the non-nitrided valve spring produced using the steel wire was 1400 MPa or more, and the fatigue limit ratio (=fatigue limit/Vickers hardness) of the non-nitrided valve spring was 2.40 or more.

On the other hand, in Test Number 14, the Si content was too low. Therefore, the fatigue limit at a high cycle of the nitrided valve spring was less than 1450 MPa, and the fatigue limit ratio was less than 2.50. Further, the fatigue limit at a high cycle of the non-nitrided valve spring was less than 1400 MPa, and the fatigue limit ratio was less than 2.40.

In Test Number 15, the V content was too low. Therefore, in the steel wire, the number density of V-based precipitates having a maximum diameter ranging from 2 to 10 nm was too low. Consequently, the fatigue limit at a high cycle of the nitrided valve spring was less than 1450 MPa, and the fatigue limit ratio was less than 2.50. Further, the fatigue limit at a high cycle of the non-nitrided valve spring was less than 1400 MPa, and the fatigue limit ratio was less than 2.40.

In Test Number 16, Ca was not contained in the chemical composition. Consequently, the fatigue limit at a high cycle of the nitrided valve spring was less than 1450 MPa. and the fatigue limit ratio was less than 2.50. Further, the fatigue limit at a high cycle of the non-nitrided valve spring was less than 1400 MPa, and the fatigue limit ratio was less than 2.40.

In Test Number 17, the Ca content was too high. Therefore, in the steel wire, the Ca sulfides numerical proportion was too high. Consequently, the fatigue limit at a high cycle of the nitrided valve spring was less than 1450 MPa, and the fatigue limit ratio was less than 2.50. Further, the fatigue limit at a high cycle of the non-nitrided valve spring was less than 1400 MPa, and the fatigue limit ratio was less than 2.40.

In Test Numbers 18 and 19, although the chemical composition was appropriate, the V-based precipitates formation heat treatment was not performed. Therefore, in the steel wire, V-based precipitates having a maximum diameter ranging from 2 to 10 nm did not precipitate. Consequently, the fatigue limit at a high cycle of the nitrided valve spring was less than 1450 MPa, and the fatigue limit ratio was less than 2.50. Further, the fatigue limit at a high cycle of the non-nitrided valve spring was less than 1400 MPa, and the fatigue limit ratio was less than 2.40.

In Test Numbers 20 and 21, although the chemical composition was appropriate, the heat-treatment temperature in the V-based precipitates formation heat treatment was too low. Therefore, in the steel wire, V-based precipitates having a maximum diameter ranging from 2 to 10 nm did not precipitate. Consequently, the fatigue limit at a high cycle of the nitrided valve spring was less than 1450 MPa, and the fatigue limit ratio was less than 2.50. Further, the fatigue limit at a high cycle of the non-nitrided valve spring was less than 1400 MPa, and the fatigue limit ratio was less than 2.40.

In Test Number 22, although the chemical composition was appropriate, the heat-treatment temperature in the V-based precipitates formation heat treatment was too high. Therefore, in the steel wire, V-based precipitates coarsened and the number density of V-based precipitates having a maximum diameter ranging from 2 to 10 nm was too low. Consequently, the fatigue limit at a high cycle of the nitrided valve spring was less than 1450 MPa, and the fatigue limit ratio was less than 2.50. Further, the fatigue limit at a high cycle of the non-nitrided valve spring was less than 1400 MPa, and the fatigue limit ratio was less than 2.40.

In Test Number 23, in the refining process, the Ca content in ferro-alloys added to the molten steel in the secondary refining was more than 1.0%. Therefore, in the steel wire, the Ca sulfides numerical proportion was too high. Consequently, the fatigue limit at a high cycle of the nitrided valve spring was less than 1450 MPa, and the fatigue limit ratio was less than 2.50. Further, the fatigue limit at a high cycle of the non-nitrided valve spring was less than 1400 MPa. and the fatigue limit ratio was less than 2.40.

In Test Number 24, in the secondary refining of the refining process, the timing at which slag forming agents were added to the molten steel was after 4t/5 (that is, 0.80 t) had passed from the time at which the secondary refining started. Therefore, the Ca sulfides numerical proportion in the steel wire was too high. Consequently, the fatigue limit at a high cycle of the nitrided valve spring was less than 1450 MPa, and the fatigue limit ratio was less than 2.50. Further, the fatigue limit at a high cycle of the non-nitrided valve spring was less than 1400 MPa, and the fatigue limit ratio was less than 2.40.

In Test Number 25, although the chemical composition was appropriate and the heat-treatment temperature in the V-based precipitates formation heat treatment was appropriate, Fn was less than 27.0. Therefore, the number density of V-based precipitates having a maximum diameter ranging from 2 to 10 nm in the steel wire was too low. Consequently, the fatigue limit at a high cycle of the nitrided valve spring was less than 1450 MPa, and the fatigue limit ratio was less than 2.50. Further, the fatigue limit of the non-nitrided valve spring was less than 1400 MPa, and the fatigue limit ratio was less than 2.40.

In Test Number 26, although the chemical composition was appropriate and the heat-treatment temperature in the V-based precipitates formation heat treatment was appropriate, Fn was more than 40.0. Therefore, the number density of V-based precipitates having a maximum diameter ranging from 2 to 10 nm in the steel wire was too low. Consequently, the fatigue limit at a high cycle of the nitrided valve spring was less than 1450 MPa, and the fatigue limit ratio was less than 2.50. Further, the fatigue limit of the non-nitrided valve spring was less than 1400 MPa, and the fatigue limit ratio was less than 2.40.

Embodiments of the present invention have been described above. However, the foregoing embodiments are merely examples for implementing the present invention. Accordingly, the present invention is not limited to the above embodiments, and the above embodiments can be appropriately modified and implemented within a range that does not deviate from the gist of the present invention.

The invention claimed is:

1. A steel wire having a chemical composition consisting of, in mass %,
C: 0.53 to 0.59%,
Si: 2.51 to 2.90%,
Mn: 0.70 to 0.85%,
P: 0.020% or less,
S: 0.020% or less,
Cr: 1.40 to 1.70%,
Mo: 0.17 to 0.53%,
V: 0.23 to 0.33%,
Cu: 0.050% or less,
Ni: 0.050% or less,
Al: 0.0050% or less,
Ti: 0.050% or less,
N: 0.0070% or less,
Ca: 0 to 0.0050%, and
Nb: 0 to 0.020%,
with the balance being Fe and impurities,
wherein a number density of V-based precipitates having a maximum diameter ranging from 2 to 10 nm is 500 to 8000 per $\mu m^2$.

2. The steel wire according to claim 1, wherein:
in the chemical composition, a Ca content is from 0.0001 to 0.0050%; and
when, among inclusions,
inclusions in which, in mass %, an O content is 10.0% or more are defined as oxide-based inclusions,
inclusions in which, in mass %, an S content is 10.0% or more and the O content is less than 10.0% are defined as sulfide-based inclusions, and
among the sulfide-based inclusions, inclusions in which, in mass %, a Ca content is 10.0% or more, the S content is 10.0% or more, and the O content is less than 10.0% are defined as Ca sulfides,
a numerical proportion of the Ca sulfides with respect to a total number of the oxide-based inclusions and the sulfide-based inclusions is 0.20% or less.

3. The steel wire according to claim 1, wherein,
in the chemical composition:
an Nb content is 0.005 to 0.020%.

4. The steel wire according to claim 2, wherein,
in the chemical composition:
an Nb content is 0.005 to 0.020%.

* * * * *